US008272713B2

(12) United States Patent
Katoh et al.

(10) Patent No.: US 8,272,713 B2
(45) Date of Patent: Sep. 25, 2012

(54) IMAGE FORMING APPARATUS

(75) Inventors: Tomomi Katoh, Kanagawa (JP); Toshiroh Tokuno, Tokyo (JP); Jun Ichinowatari, Kanagawa (JP); Fumitaka Kikkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 12/957,824

(22) Filed: Dec. 1, 2010

(65) Prior Publication Data

US 2011/0134184 A1 Jun. 9, 2011

(30) Foreign Application Priority Data

Dec. 7, 2009 (JP) ................................ 2009-278001

(51) Int. Cl.
*B41J 2/165* (2006.01)
*F16K 31/00* (2006.01)
*B41J 2/175* (2006.01)

(52) U.S. Cl. ............ 347/30; 347/85; 251/12; 251/30.05

(58) Field of Classification Search .................... 347/30, 347/85

See application file for complete search history.

(56) References Cited

U.S. PATENT DOCUMENTS 5,446,486 A 8/1995 Reis
7,325,908 B2 2/2008 Katoh et al.
7,547,097 B2 * 6/2009 Tsukada et al. ................. 347/85
2005/0062809 A1 * 3/2005 Yoshino et al. ................. 347/85
2008/0273046 A1 11/2008 Ishinaga et al.
2009/0051724 A1 2/2009 Katoh
2009/0153628 A1 * 6/2009 Yokouchi ........................ 347/85
2009/0284572 A1 11/2009 Katoh
2009/0290002 A1 11/2009 Katoh
2010/0214378 A1 8/2010 Katoh et al.
2011/0050816 A1 * 3/2011 Katoh et al. .................... 347/85

FOREIGN PATENT DOCUMENTS

JP 5-504308 7/1993
JP 2002-178537 6/2002
JP 2004-284084 10/2004
JP 2004-351845 12/2004
JP 2005-96404 4/2005
JP 2005-342960 12/2005
JP 2006-150745 6/2006
JP 2007-185905 7/2007

* cited by examiner

*Primary Examiner* — Jessica Stultz
*Assistant Examiner* — Alexander D. Shenderov
(74) *Attorney, Agent, or Firm* — Cooper & Dunham LLP

(57) ABSTRACT

An image forming apparatus includes a recording head, a liquid tank, a first fluid flow path supplying liquid to the recording head, a second fluid flow path being in communication with the liquid tank, a pressure adjusting valve allowing fluid communication between the first and the second fluid flow paths, a cap member covering a nozzle surface of the recording head, and a suction unit being in communication with the cap member. The pressure adjusting valve includes a movable member movably disposed in the internal fluid flow path, wherein the movable member includes a sealing unit that seals the communication between the first and the second fluid flow paths when the cap member covers the nozzle surface of the recording head and a negative pressure is generated in a cap-member space formed between the cap member and the nozzle surface by driving the suction unit.

8 Claims, 26 Drawing Sheets

IMAGE FORMING APPARATUS

CROSS-REFERENCE TO RELATED APPLICATIONS

The present application claims priority under 35 U.S.C §119 based on Japanese Patent Application No. 2009-278001 filed Dec. 7, 2009, the entire contents of which are hereby incorporated herein by reference.

BACKGROUND OF THE INVENTION

1. Field of the Invention

The present invention generally relates to an image forming apparatus, and more particularly to an image forming apparatus having a recording head discharging liquid droplets.

2. Description of the Related Art

As an image forming apparatus such as a printer, a facsimile machine, a copier, a multi-function peripheral thereof and the like, there has been known an inkjet recording apparatus and the like employing a liquid discharging recording method using a recording head that discharges ink droplets. In the image forming apparatus employing the liquid discharging recording method, an image is formed by discharging ink droplets from a recording head onto a fed sheet. Herein, the term "forming" is a synonym of the terms recording, typing, imaging, and printing. The image forming apparatus employing the liquid discharging recording method includes a serial-type image forming apparatus and a line-type image forming apparatus. In the serial-type image forming apparatus, an image is formed by discharging ink droplets from the recording head while the recording head moves in the main scanning direction. On the other hand, in the line-type image forming apparatus, an image is formed by discharging ink droplets from the line-type recording head while the recording head does not change its position.

Herein, the term "image forming apparatus" refers to an apparatus (including a simple liquid discharging apparatus) forming an image by discharging ink onto a medium including paper, thread, fiber, textile, leather, metal, plastic, glass, wood, ceramic and the like. Further, this term "image forming apparatus" refers to a simple liquid discharging apparatus as well. The term "image forming" refers to not only forming a meaningful image such as characters, figures, and the like on a medium but also forming a meaningless image such as a pattern and the like on a medium (including simply discharging droplets onto a medium by an apparatus such as so-called a droplet discharging apparatus or a liquid discharging apparatus). Further, the term "ink" is collectively used to refer to not only any material called "ink" but also any liquid for forming an image which may be called recording liquid, fixing processing liquid, liquid, a DNA sample, a patterning material or the like. Further, the term "sheet" is not limited to a material made of paper, and is collectively used to refer to any material called a medium to be recorded on, a recording medium, recording paper, recording sheet, and the like to which ink (ink droplets) is adhered, the material including an OHP sheet, fabric and the like. Further, the "image" is not limited to a planar image. For example, the "image" includes an image formed on a material that is three-dimensionally formed, and an image three-dimensionally formed made of three-dimensional figures.

As a liquid discharging head (droplet discharging head) to be used as the recording head, there have been known a piezoelectric type head and a thermal-type head. In the piezoelectric type head, liquid droplets are discharged by increasing the pressure by changing a volume in the liquid chamber by displacing a vibration plate using a piezoelectric actuator or the like. On the other hand, in the thermal-type head, the liquid droplets are discharged by increasing the pressure in the liquid chamber by generating bubbles by heating a heating element in the liquid chamber by supplying a current to the heating element.

Regarding the image forming apparatus employing such a liquid discharging method, there has been a demand for the increase of the image forming speed. To that end, a method is widely used in which ink is supplied from the ink cartridge (main tank) to a sub tank (which may also be called a head tank, or a buffer tank) via a tube, the ink cartridge (main tank) having a large capacity and being installed to be fixed to the apparatus body, the sub tank being disposed on the recording head. By using this method (tube-supply method) using such a tube to supply ink, it becomes possible to reduce the size and weight of the carriage section, thereby enabling greatly reducing the size of the structure and driving mechanism of the apparatus.

In the tube-supply method, the ink to be consumed in the recording head for forming an image is supplied from the ink cartridge to the recording head via a tube. In this case, when a very flexible and thin tube is used, the fluid resistance when ink flows in the tube may be increased, which may cause an ink discharge failure in which necessary ink may not be sufficiently supplied to maintain the discharge stability of the ink. Especially, in a large-scale apparatus for printing a wide recording medium, the tube may become longer. As a result, the fluid resistance of the tube may be accordingly increased. Similarly, when fast printing is performed and when the ink having high viscosity is discharged, the fluid resistance may be also increased. As a result, a failure of supplying ink to the recording head may occur.

To overcome such failure, as Japanese Patent Application Publication No. 2005-096404 (Patent Document 1) discloses, there is a conventionally known technique in which a pressure applied to the ink in the ink cartridge is maintained, and a differential pressure valve is disposed on the ink supply upstream side of the recording head, so that the ink is supplied when the negative pressure of the sub tank is greater than a predetermined pressure.

Further, as disclosed in Japanese Patent Application Publication No. 2005-342960 (Patent Document 2), to cancel the pressure loss due to the fluid resistance of the tube, the ink supply pressure is positively (actively) controlled by using a pump to feed the ink to the negative pressure chamber where a negative pressure is generated using a spring, the negative pressure room being disposed on the upstream side of the recording head. Further, as disclosed in Japanese Patent Application Publication No. 5-504308 (Patent Document 3), a pump is similarly used to positively (actively) control the pressure without having a negative pressure chamber.

On the other hand, to obtain the negative pressure with a simple configuration, the ink cartridge in communication with air communicates with the recording head via a tube, and the ink cartridge is simply disposed below the recording head. By doing this, negative pressure can be obtained by the water head difference.

By using this method (the water head difference), more stable negative pressure may be obtained with a much simpler configuration when compared with a method in which a pressure is always applied by using a negative pressure associated valve or a method in which the negative pressure chamber is disposed and the pump is used to supply liquid. However, in this method based on the water head difference, the pressure loss due to the fluid resistance in the tube may become a problem.

There is a known method of resolving the pressure loss problem in the ink supply system obtaining negative pressure using the water head difference. In this method, for example, as disclosed in Japanese Patent Application Publication No. 2004-351845 (Patent Document 4), a pump is provided in the tube between the recording head and the ink cartridge, and a bypass flow path connecting the upstream side and the downstream side of the pump is further provided. In addition, a valve is provided in the bypass flow path, and the opening of the valve is appropriately controlled depending on the printing state, so that a desired pressure can be maintained.

On the other hand, in an image forming apparatus employing the liquid discharging method, it is necessary to have an apparatus (a maintenance-and-recovery mechanism) that maintains and recovers the performance of the recording head discharging ink. Further, as one of the functions of the maintenance-and-recovery mechanism, it is necessary to discharge bubbles, foreign matter, sticky ink and the like in the recording head through the nozzles so as to reduce the likelihood of the occurrence of the ink discharge failure.

As the methods of suctioning and discharging ink through the nozzles, there are conventionally known methods including a method in which the nozzle surfaces are capped with caps and ink is suctioned by suctioning means as disclosed in Japanese Patent Application Publication No. 2004-284084 (Patent Document 5), a method in which pressurized ink is supplied to the recording head to discharge ink through the nozzles as disclosed in Japanese Patent Application Publication Nos. 2007-185905 and 2006-150745 (Patent Documents 6 and 7, respectively), and a method in which the pressurizing and the suctioning are jointly performed as disclosed in Japanese Patent Application Publication No. 2002-178537 (Patent Documents 8).

Further, Patent Document 1 further discloses a method in which bubble exhaust capability is improved by providing a bubble unit in the ink supply path, closing the ink supply path when ink is suctioned through the nozzles to perform choke cleaning, and releasing the accumulated negative pressure in a short period.

However, in the method disclosed in Patent Document 1, the problem of shortage of refill supplies as described above may be resolved. However, the mechanism of controlling the negative pressure is complicated and the demand for the sealing characteristics of the negative pressure associated valve is very high. In addition, the pressure is always required to be applied. Because of this feature, the demand for the sealing characteristics of all the connecting sections in the ink supply flow path is high, and in case of trouble, ink may spout out.

In the method disclosed in Patent Documents 2 and 3, the pump is used to positively (actively) control the pressure. Therefore, it is required to accurately control the liquid feeding flow rate by using the pump in response to the consumption flow rate of ink and the like. To that end, for example, it may become necessary to perform feedback control based on the pressure of the negative pressure chamber. Further, for example, when this method is applied to an image forming apparatus using plural different colors of ink, it is required to separately control the pump for each of the color inks. As a result, the control may become complicated and the size of the apparatus may be increased.

Also in the method disclosed in Patent Document 4, when this method is applied to an image forming apparatus using plural different color inks, it is required to control the pumps for the respective color inks. As a result, the size of the apparatus may be increased.

On the other hand, in terms of the maintenance-and-recovery operation, as in a technique disclosed in Patent Document 5, in the configuration where ink is suctioned and exhausted through the nozzles, the flow rate near the nozzles may become larger (faster), which may be effective to exhaust foreign matter. However, when the exhaust capability is to be improved, the caps are required to endure high pressure, which may make it difficult to further improve the exhaust capability. Further, when the inside of the caps is released into atmosphere, ink and bubbles near the nozzles may easily flow backward, which further requires taking measures to prevent the discharge failure due to the backward flow.

Further, as in the technique disclosed in Patent Document 6, in the configuration where the ink in the recording head is suddenly pressurized by using a pressing force by pressing means so that the pressurized ink is discharged, the configuration of the pressing room may become complicated. In addition, when the exhaust capability is to be further improved, it may become necessary to have a sealing capability (i.e., pressure resistance) of the entire ink supply path. As a result, the cost of the entire apparatus may be increased.

Further, as in the technique disclosed in Patent Document 7, in the configuration where the internal pressure of the buffer tank is increased to a predetermined pressure by using the pre-compression means in advance, and ink is supplied, the configuration including the pre-compression means may become complicated, and the pressure resistance (sealing capability) is also required to be provided.

Further, as in the technique disclosed in Patent Document 8, in the configuration where the pressurizing and the suctioning operations are jointly performed, a high exhaust capability based on the differential pressure between the pressurizing and suctioning operations may be obtained. It may, however, become difficult to remarkably improve the exhaust efficiency for an ink consumption amount.

Further, in the technique disclosed in Patent Document 1, the valve unit is provided in the ink supply path to perform the choke cleaning by closing the ink supply path when ink is suctioned through the nozzles, so that accumulated negative pressure can be released in a short period. However, the choke status is formed by using the flexibility of the film. Because of this feature, the accumulated negative pressure is limited, and there also exists a problem in durability. Further, since the valve unit is required to be provided as described above, the configuration of the entire ink supply system may become further complicated.

SUMMARY OF THE INVENTION

The present invention is made in light of the above problems, and may provide an image forming apparatus having a simpler configuration, capable of maintaining stable negative pressure, increasing the speed of the operations, increasing the length of the tube used therein, preventing the refill shortage even when ink having high viscosity is used, and capable of further improving the exhaust capability of exhausting bubbles, foreign matter and the like in the recording head.

According to an aspect of the present invention, an image forming apparatus includes a recording head having a nozzle for discharging droplets of liquid; a liquid tank that stores liquid to be supplied to the recording head; a first fluid flow path that supplies the liquid to the recording head; a second fluid flow path that is in fluid communication with the liquid tank; a pressure adjusting valve that allows fluid communication between the first fluid flow path and the second fluid flow path and that has an internal flow path resistance that varies depending upon a flow rate of liquid flowing through the first fluid flow path; a third fluid flow path that allows fluid communication between the second fluid flow path and the pressure adjusting valve or between the liquid tank and the pressure adjusting valve; a liquid feeding unit provided in the third fluid flow path; a cap member that covers a nozzle surface of the recording head; and a suction unit that is in fluid communication with the cap member. Further, when droplets of liquid are discharged through the nozzle, the recording head is in fluid communication with the liquid tank via the pressure adjusting valve, and the liquid feeding unit feeds the liquid from the liquid tank to the recording head. The pressure adjusting valve includes a tube member that defines an internal fluid flow path of the pressure adjusting valve; and a movable member that is movably disposed in the internal fluid flow path. Further the tube member and the movable member form a first throttling part disposed on a side of the first fluid flow path and a second throttling part disposed on a side of the second fluid flow path; the third fluid flow path is in fluid communication with a part between the first throttling part and the second throttling part; the movable member moves depending on the flow rate of liquid flowing in the first fluid flow path; a throttle value of the second throttling part varies depending on a movement of the movable member; and the movable member includes a sealing unit that seals the fluid communication between the first fluid flow path and the second fluid flow path when the cap member covers the nozzle surface of the recording head and a negative pressure is generated in a cap-member space formed between the cap member and the nozzle surface by driving the suction unit.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, embodiments of the present inventions are described with reference to the accompanying drawings.

Figure 1:
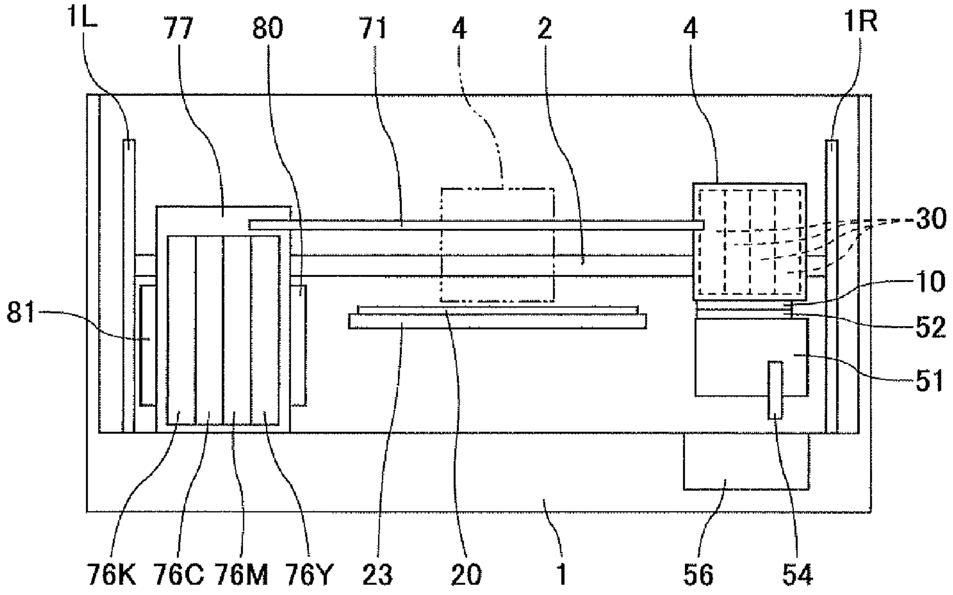
FIG. 1 is a schematic front view illustrating an inkjet recording apparatus as an image forming apparatus according to an embodiment of the present invention.
Figure 2:
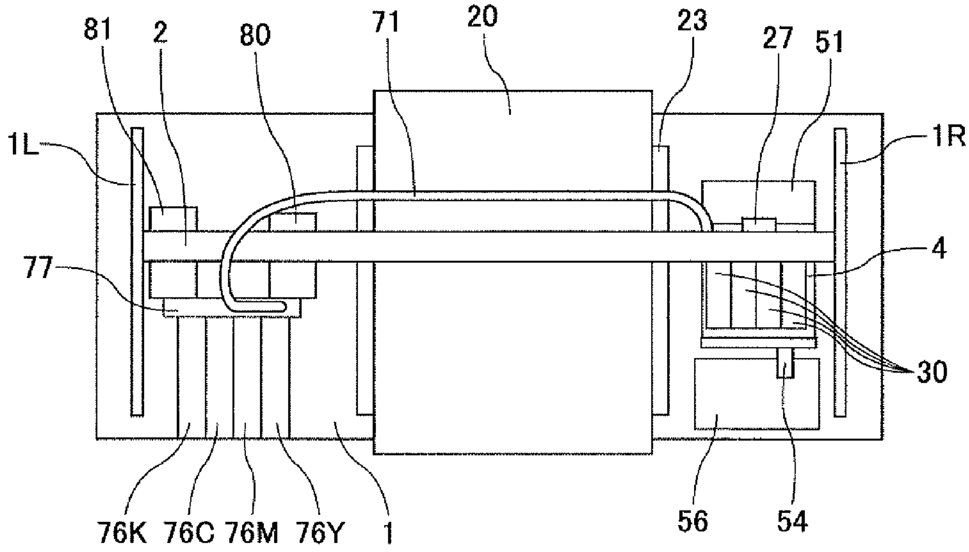
FIG. 2 is a schematic top view illustrating the inkjet recording apparatus.
Figure 3:
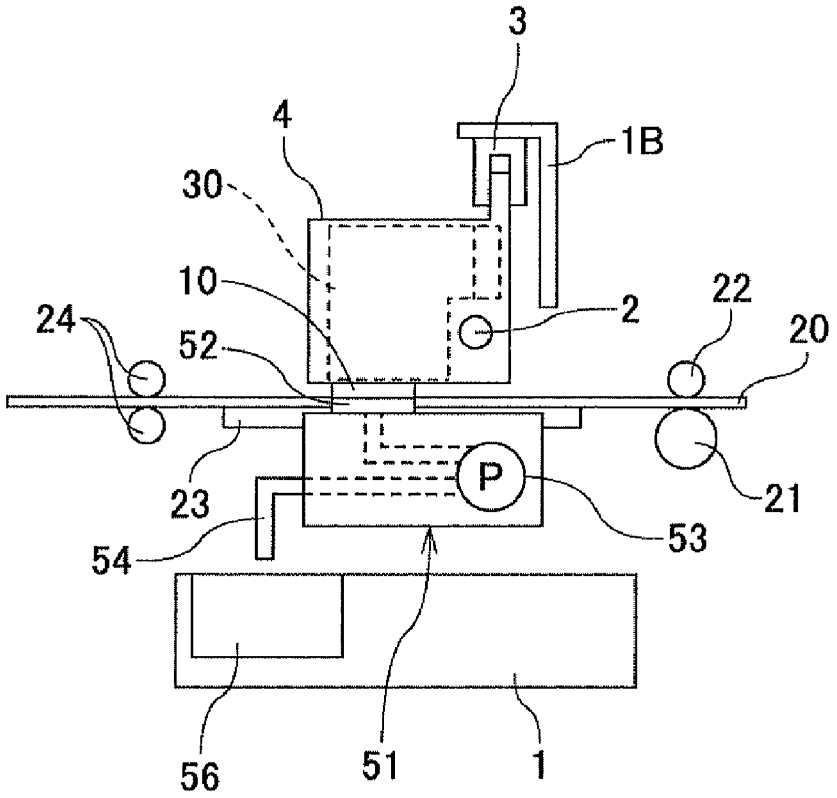
FIG. 3 is a schematic side view illustrating the inkjet recording apparatus.

First, an inkjet recording apparatus as an image forming apparatus according to an embodiment of the present invention is described with reference to FIGS. 1 through 3. FIGS. 1 through 3 are a schematic front view, a schematic top view, and a schematic side view, respectively, of the inkjet recording apparatus.

As illustrated in FIGS. 1 through 3, in the inkjet recording apparatus, a carriage 4 is slidably supported by a guide rod 2 and a guide rail 3 in the main scanning direction (guide rod longitudinal direction), so that the carriage 4 moves in the longitudinal direction (main scanning direction) of the guide rod 2 by using a main-scanning motor 51 and a timing belt. The guide rod 2 is a guide member bridged between two side plates 1L and 1R which are installed in a standing manner on the left and right sides, respectively, of a main body frame 1. The guide rail 3 is attached to a rear frame 1B after the rear frame 1B is bridged between the main body frame 1.

On the carriage 4, one or more recording heads 10 are mounted discharging, for example, black (K), cyan (C), magenta (M), and yellow (Y) ink droplets. The recording heads 10 have plural ink discharging ports (nozzles) arranged in the direction crossing the main scanning direction so that ink discharging direction is in the downward direction.

Figure 4:
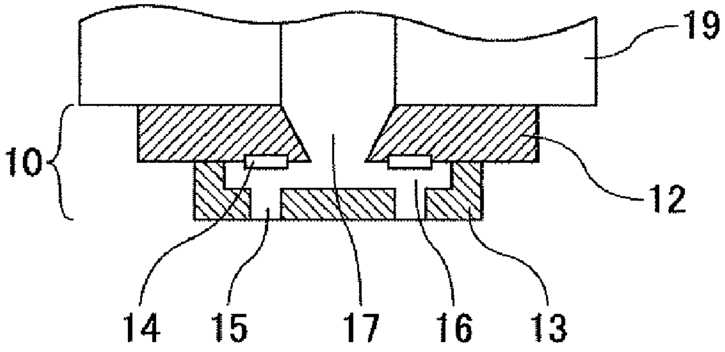
FIG. 4 is an enlarged cross-sectional view illustrating a recording head of the inkjet recording apparatus.

Herein, as illustrated in FIG. 4, the recording heads 10 include a heating body substrate 12 and a liquid-chamber defining member 13, so that ink is discharged as liquid droplets, the ink being supplied from an ink supply path defined by a base member 19 to a liquid chamber (separate flow path) 16 via a common flow path 17. The recording heads 10 employ a thermal type method in which a pressure for discharging ink is generated by film boiling of ink driven by a heating body 14. Further, the recording heads 10 employ a side shooter method in which an ink flowing direction towards a discharge energy operating section (heating body section) in the liquid chamber (separate flow path) 16 is orthogonal to the direction of the center axis of the opening of the nozzle 15.

There are various types of the recording heads. For example, in one method employed by the recording head, the pressure for discharging ink is obtained by deforming a vibration plate using a piezoelectric device or electrostatic force. The recording head employing any other method may also be used in the image forming apparatus according to an embodiment of the present invention.

However, some recording heads using the thermal method employ an edge shooter method in which the relationship between the ink flowing direction and the center axis direction is different from that in the side shooter method. When this edge shooter method is used, the heating body 14 may be gradually destroyed due to the impact generated during bubble collapse. This phenomenon is known as a cavitation phenomenon. On the contrary, the side shooter method may have the following advantages when compared with the edge shooter method due to the structural difference. In the side shooter method, when bubbles expand and reach the nozzle 15, the bubbles reach air also, which decreases the temperature of the bubbles. Therefore, the bubbles are unlikely to be shrunk due to the temperature decrease. As a result, the lifetime of the recording head may become longer. Further, the thermal energy from the heating body 14 may be effectively converted into kinetic energy used for forming and discharging ink droplets. Further, the meniscus may be recovered faster due to ink supply. Because of the advantages, the recording head of the inkjet recording apparatus according to an embodiment of the present invention employs the side shooter method.

On the other hand, under the carriage 4, a sheet 20 on which an image is to be formed by the recording head 10 is fed in the direction (sub scanning direction) orthogonal to the main scanning direction. As illustrated in FIG. 3, the sheet 20 is sandwiched between a feeding roller 21 and a pressing roller 22 and fed to an image forming region (printing section) on an image guide member 23. Then, the sheet 20 is further fed in the discharge direction by a sheet discharging roller pair 24.

During that period, the scanning of the carriage 4 in the main scanning direction and the ink discharge from the recording head 10 are synchronized with each other at appropriate timings based on image data to be printed. By doing this, one band of an image is formed on the sheet 20. After one band of the image forming is completed, the sheet 20 is fed in the sub scanning direction by a predetermined distance. Then the same image forming operation is repeated until the entire page of the image forming operation is completed.

On the other hand, a sub tank (buffer tank, head tank) 30 and the recording head 10 are integrally connected to each other so that the sub tank 30 is disposed on the recording head 10, the sub tank being provided for temporarily storing ink to be discharged. Herein, the state expressed by the term "integrally (connected)" includes a state in which the recording head 10 and the sub tank 30 are connected with a tube and the like, and both of the recording head 10 and the sub tank 30 are mounted on the carriage 4.

Each color ink is supplied from an ink cartridge (main tank) 76 to the sub tank 30 via a liquid supply tube 71. The ink cartridge (main tank) 76 is a liquid tank according to an embodiment of the present invention containing each the color inks and is removably attached to a cartridge holder 77 disposed on one end in the main scanning direction of the apparatus main body. The liquid supply tube 71 is a tube member forming a part of the ink supply path from the ink cartridge (main tank) 76 and forming (serving as) a first flow path.

On the other end in the main scanning direction of the apparatus main body, a maintenance-and-recovery mechanism 51 is disposed that maintains and recovers the recording head 10. As illustrated in FIG. 3, the maintenance-and-recovery mechanism 51 includes a cap member 52, a suction pump 53, and a discharge path tube 54. The cap member 52 caps a nozzle surface of the recording head 10. The suction pump 53 suctions the inside of the cap member 52. The ink suctioned from the inside of the cap member 52 is discharged as waste liquid through the discharge path tube 54 to a waste liquid tank 56 disposed on a side of the main body frame 1.

Figure 9:
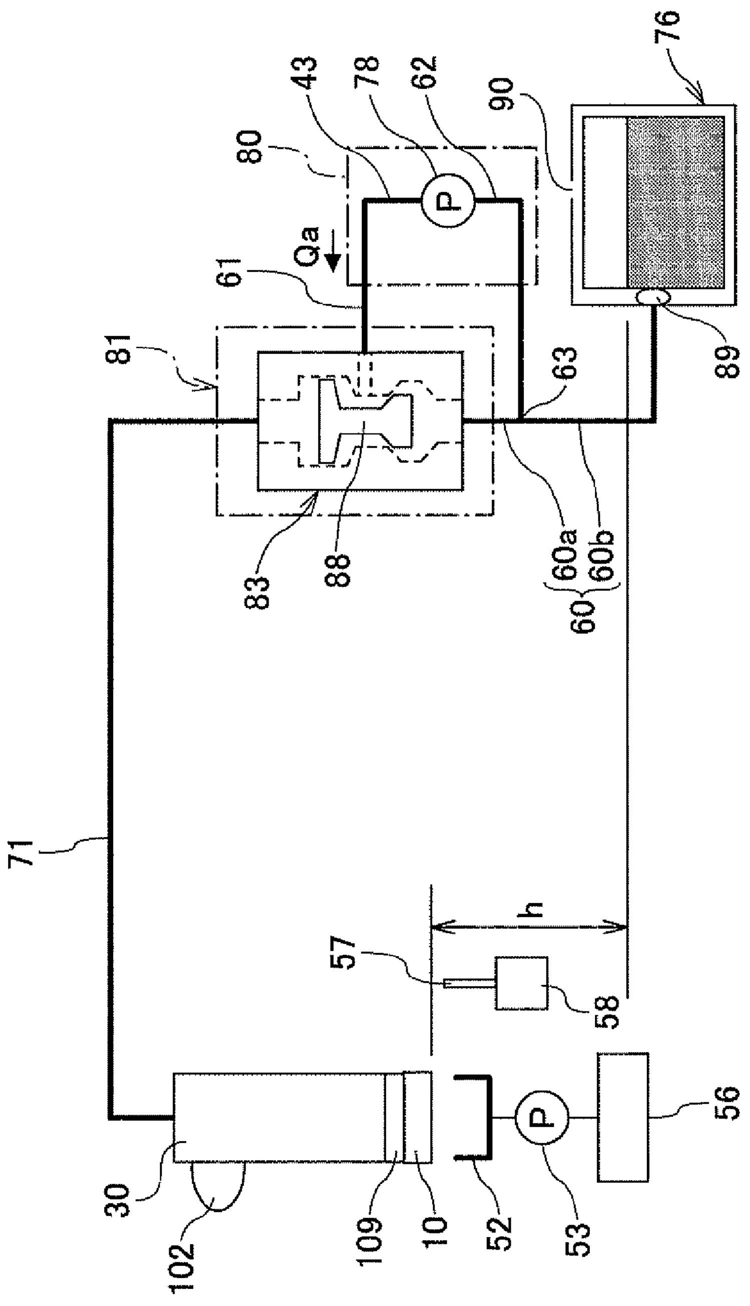
FIG. 9 is a schematic view illustrating a configuration of the ink supply system according to a first embodiment of the present invention.

The maintenance-and-recovery mechanism 51 further includes a moving mechanism (a cap elevation mechanism 513 in FIG. 11 described below) that moves (in this case elevating) the cap member 52 forward to and backward from the nozzle surface of the recording head 10. In addition, as illustrated in FIG. 9 described below, the maintenance-and-recovery mechanism 51 further includes a wiping unit 58 and a wiping member 57 that is supported by the wiping unit 58 and that is provided so as to move on the nozzle surface to wipe the nozzle surface of the recording head 10.

Figure 5:
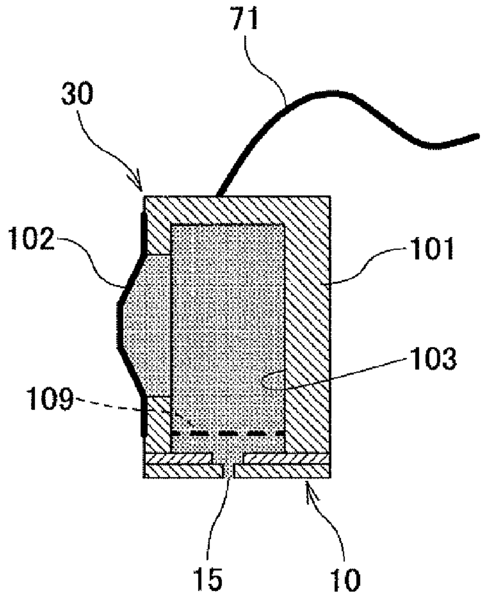
FIG. 5 is a schematic cross-sectional view illustrating a sub tank of an ink supply system of the inkjet recording apparatus.
Figure 6:
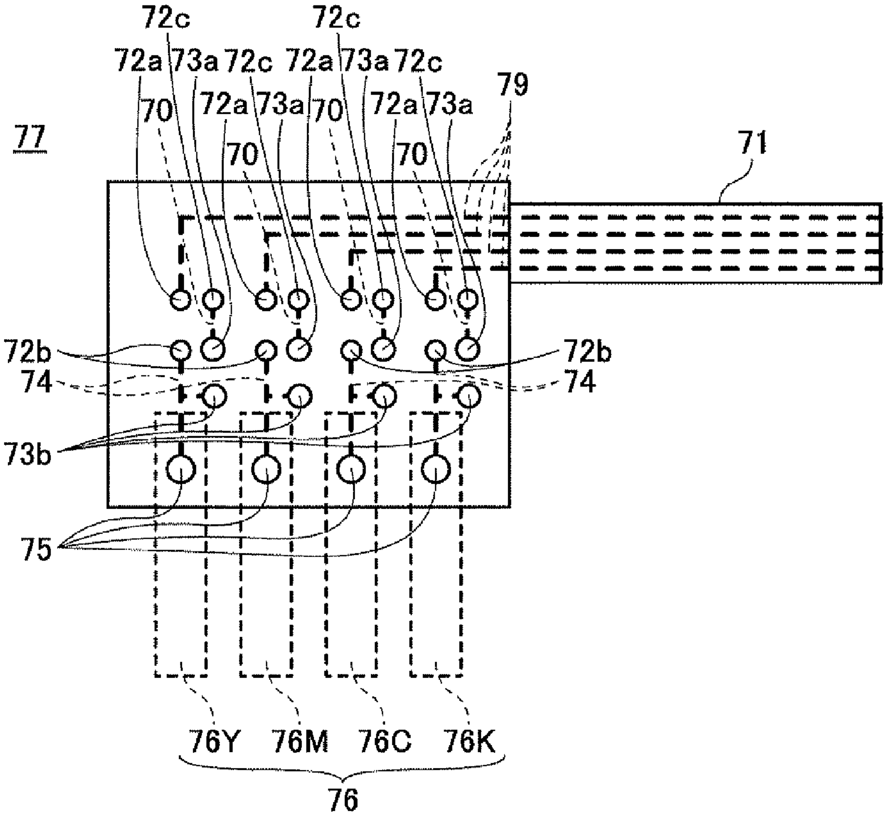
FIG. 6 is a view illustrating a part of a cartridge holder of the inkjet recording apparatus.
Figure 7:
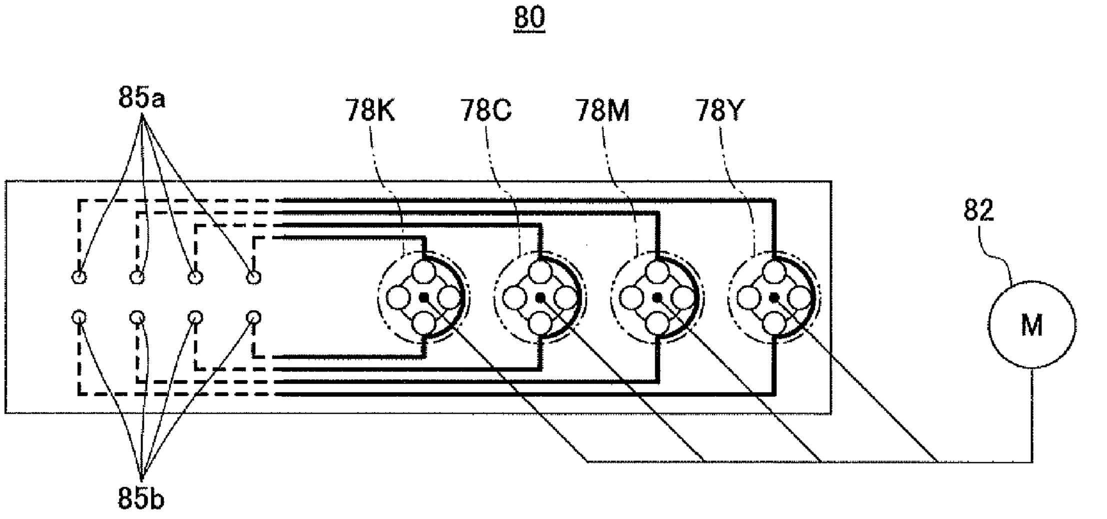
FIG. 7 is a schematic view illustrating a pump unit of the inkjet recording apparatus.
Figure 8:
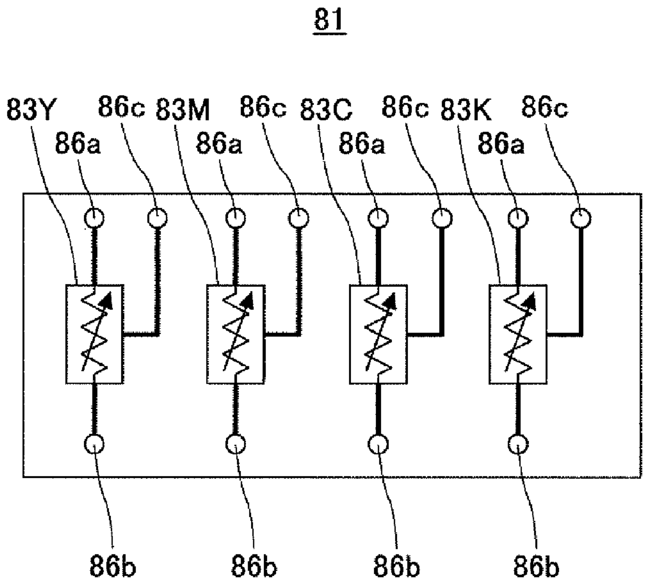
FIG. 8 is a schematic view illustrating a pressure control unit of the inkjet recording apparatus.
Figure 10B:
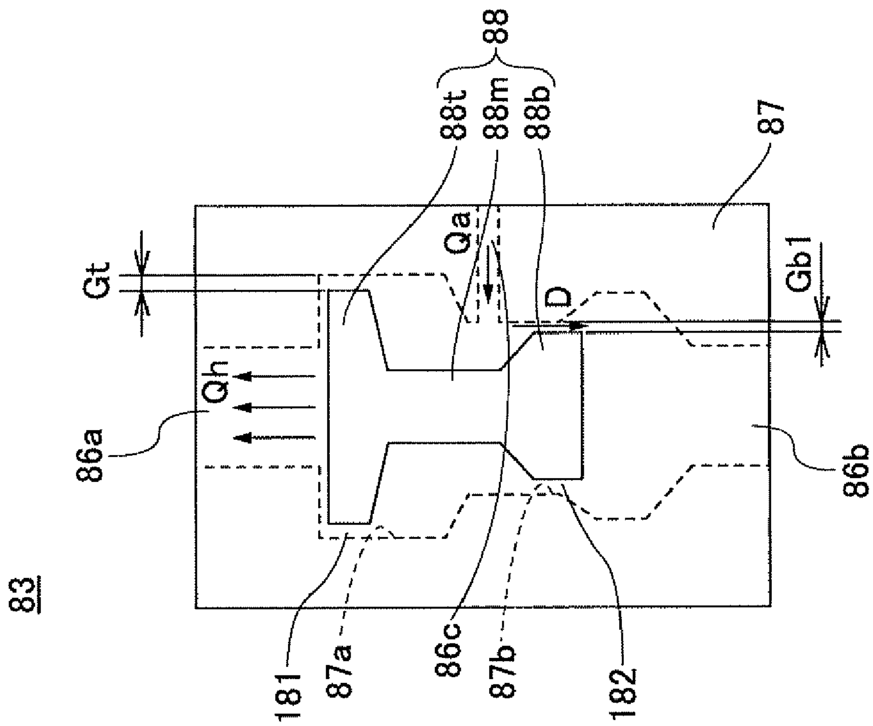
FIGS. 10A and 10B are schematic cross-sectional views illustrating an example of a flow path resistance varying unit used in the ink supply system according to the first embodiment of the present invention.
Figure 10A:
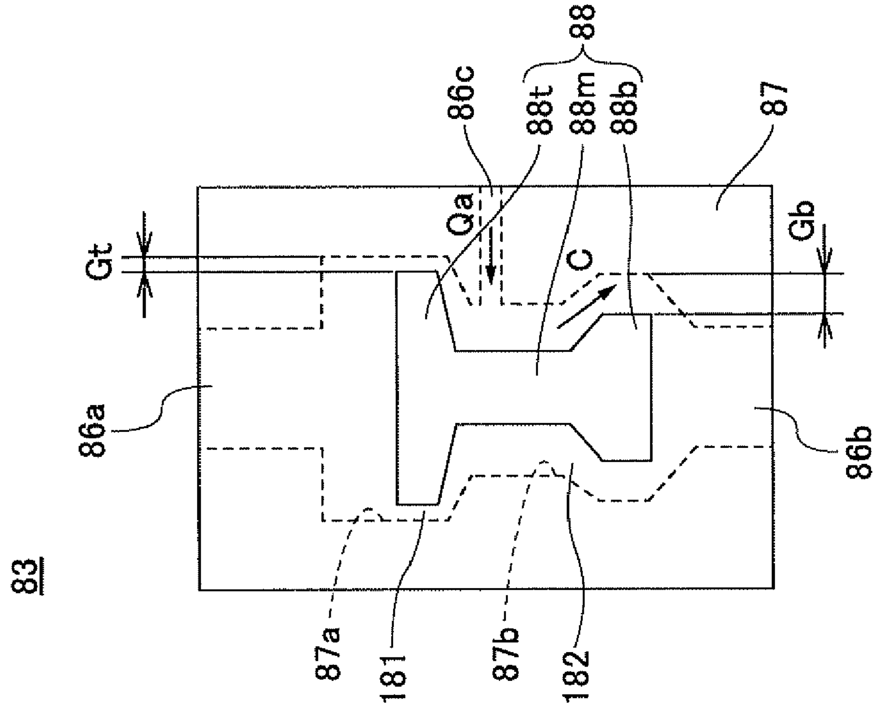

Next, an ink supply system according to a first embodiment of the present invention that can be used in the above inkjet recording apparatus is described with reference to FIGS. 5 through 10. FIG. 5 is a schematic cross-sectional view illustrating a sub tank of the ink supply system of the inkjet recording apparatus. FIG. 6 is a view illustrating a part of a cartridge holder of the inkjet recording apparatus. FIG. 7 is a schematic view illustrating a pump unit of the inkjet recording apparatus. FIG. 8 is a schematic view illustrating a pressure control unit of the inkjet recording apparatus. FIG. 9 is a schematic view illustrating a configuration of the ink supply system according to the first embodiment of the present invention. FIGS. 10A and 10B are schematic cross-sectional views illustrating an example of a flow path resistance varying unit used in the ink supply system according to the first embodiment of the present invention.

FIG. 5 illustrates a configuration of the sub tank 30. As illustrated in FIG. 5, the sub tank 30 includes a tank case 101 defining an ink chamber 103 and having an opening. The opening is sealed with a flexible rubber member 102 formed in a manner such that the rubber member 102 has a convex part protruding outwardly from the opening. Further, a filter 109 is disposed in the ink chamber 103 and near a connecting part 15 between the sub tank 30 and the recording head 10, so that the filter 109 filters the ink to remove impurities and the like from the ink and the filtered ink is supplied to the recording head 10.

Further, one end of the liquid (ink) supply tube 71 is connected to the sub tank 30. The other end of the liquid (ink) supply tube 71 is connected to the cartridge holder 77 mounted to the apparatus main body as illustrated in FIGS. 1 and 2.

Further, as schematically illustrated in FIGS. 1 and 2, the cartridge holder 77 is connected with the ink cartridge (main tank) 76, a pump unit 80 serving as fluid feeding means (fluid feeding unit), and a pressure control unit 81.

FIG. 6 illustrates a configuration of the cartridge holder 77. As illustrated in FIG. 6, in the cartridge holder 77, internal flow paths 70, 74, and 79 for each color are formed. Further, there are pump connection ports 73*a* and 73*b* communicating with the pump unit 80, and there are pressure control ports 72*a*, 72*b*, and 72*c* communicating with the pressure control unit 81. The pump connection ports 73*a* and the pressure control ports 72*c* are communicating with each other via the internal flow path 70.

FIG. 7 illustrates a configuration of the pump unit 80. As illustrated in FIG. 7, in the pump unit 80, there are ports 85*a* and 85*b* to be in communication with the pump connection ports 73*a* and 73*b*, respectively. Further, there is a pump (assist pump) 78 serving as fluid feeding means (fluid feeding unit) communicating between the ports 85*a* and 85*b*. As the pump (assist pump) 78, any of various pumps such as a tubing pump, a diaphragm pump, and a gear pump may be used. In the pump unit 80 of FIG. 7, four pumps 78K, 78C, 78M, and 78Y are provided for four color inks. Further, those four pumps are collectively driven by one motor 82.

FIG. 8 illustrates a configuration of the pressure control unit 81. As illustrated in FIG. 8, the pressure control unit 81 includes ports 86*a*, 86*b*, and 86*c* and a flow path resistance varying unit 83. The ports 86*a*, 86*b*, and 86*c* are in communication with the pressure control ports 72*a*, 72*b*, and 72*c*, respectively, of the cartridge holder 77. The flow path resistance varying unit 83 serves as a pressure adjusting valve and is in communication with the ports 86*a*, 86*b*, and 86*c*.

Next, an exemplary configuration and operations of the ink supply system according to the first embodiment of the present invention are described with reference to FIG. 9. FIG. 9 illustrates a schematic configuration of the ink supply system according to the first embodiment of the present invention. For simplification and explanatory purposes, only main elements connected to one liquid discharging head (i.e., recording head) 10 are illustrated.

As illustrated in FIG. 9, the ink supply system includes the ink cartridge (main tank) 76, the liquid (ink) supply tube 71, a second flow path 60, the pressure control unit 81, the pump unit 80, and a third flow path 61 and 62. The ink cartridge (main tank) 76 stores ink to be supplied to the recording head 10. The liquid (ink) supply tube 71 is disposed between the pressure control unit 81 and the recording head 10 and is used to supply ink to the recording head 10. Herein, the liquid (ink) supply tube 71 may also be called a "first flow path (71)". The second flow path 60 is disposed between the ink cartridge (main tank) 76 and the pressure control unit 81 and is used to supply ink from the ink cartridge (main tank) 76 (the second flow path 60 is in communication with the ink cartridge (main tank) 76). The second flow path 60 has a branch section 63 in the middle of the second flow path 60. The pressure control unit 81 is disposed between the first flow path 71 and the second flow path 60 so that the first flow path 71 is in communication with the second flow path 60 via the pressure control unit 81. Further, in the following, a flow path between the pressure control unit 81 and the branch section 63 may be called a flow path 60*a*, and a flow path between the ink cartridge (main tank) 76 and the branch section 63 may be called a flow path 60*b* as illustrated in FIG. 9. Herein, the pressure control unit 81 serves as the pressure adjusting valve. The pump unit 80 includes the pump (assist pump) 78 which serves as the fluid feeding means for feeding ink to the pressure adjusting valve (flow path resistance varying unit 83). The third flow path 61 and 62 (or collectively 43) includes the flow path 61 disposed between the pressure adjusting valve (flow path resistance varying unit 83) and the pump (assist pump) 78 and the flow path 62 disposed between the pump (assist pump) 78 and the branch section 63.

Herein, the flow path resistance varying unit 83 has characteristics in which the flow path resistance of the flow path resistance varying unit 83 varies depending on the flowing direction and the flow rate of the liquid flowing in the flow path resistance varying unit 83. FIGS. 10A and 10B illustrate a configuration of the flow path resistance varying unit 83. As illustrated in FIGS. 10A and 10B, the flow path resistance varying unit 83 includes a tube member 87 and a valve body 88. The tube member 87 serves as a flow path forming member (a housing) defining an internal flow path 87*a* of the pressure adjusting valve (flow path resistance varying unit 83). The valve body 88 is a movable member that is movably accommodated in an unbound state in the tube member 87.

As illustrated in FIGS. 10A and 10B, the tube member 87 has ports 86*a*, 86*b*, and 86*c*. The port 86*a* is connected to the first flow path (liquid (ink) supply tube) 71. The port 86*b* is connected to the flow path 60*a* branched by the branch section 63 in the second flow path 60. The port 86*c* is connected to the third flow path 61. The valve body 88 is an axis-shaped member having step members having different radii from each other with respect to a liquid flow direction. The valve body 88 includes at least three step members (step elements), which are a valve body top part 88*t*, a valve body middle part 88*m*, and a valve body bottom part 88*b*.

As described above, the valve body 88 is movably disposed in the tube member 87. Depending on the state of the liquid flowing in the tube member 87, the valve body 88 changes its position in the tube member 87 to the position (lower dead point) indicated in FIG. 10A, the position (upper dead point) indicated in FIG. 10B, or to any position between the lower dead point and the upper dead point.

By disposing the valve body 88 in the tube member 87, in the internal flow path 87*a*, a first throttling part 181 on the first flow path side is formed between the valve body top part 88*t* of the valve body 88 and the internal flow path 87*a* of the tube member 87 (an inner wall surface of the tube member 87). On the other hand, in the internal flow path 87*a*, a second throttling part 182 is formed between the valve body bottom part 88*b* of the valve body 88 and the internal flow path 87*b* of the tube member 87 (an inner wall surface of the tube member 87). As described above, depending on the state of the liquid flowing in the tube member 87, the valve body 88 changes its position in the tube member 87. For example, depending on the flow rate of the liquid flowing in the first flow path (liquid (ink) supply tube) 71, the valve body 88 changes its position in the tube member 87. Then, when the valve body 88 changes its position in the tube member 87, a gap between the valve body 88 and the tube member 87 may be changed. As a result of the change of the gap, a throttle value (indicating the degree of throttle) of the second throttling part 182 also varies accordingly.

Further, the tube member 87 includes a transverse hole (port) 86*c* formed from a part of the inner wall surface of the tube member 87, the part facing the valve body middle part 88*m*. Namely, the transverse hole (port) 86*c* is disposed between the first throttling part 181 and the second throttling part 182. Further, the transverse hole (port) 86*c* is connected to the third flow path 61 to serve as a part of the third flow path.

Referring back to FIG. 9, the ink cartridge (main tank) 76 includes an air communication section 90 allowing the outside and inside of the ink cartridge (main tank) 76 to communicate with each other. Further, the ink cartridge (main tank) 76 is disposed so that a liquid surface in the ink cartridge (main tank) 76 is disposed at a lower position than that of the nozzle surface of the recording head 10. By having this configuration, when the entire ink supply path is filled with ink, the recording head 10 is maintained at a negative pressure due to a water head difference "h" between the liquid surfaces of the recording head 10 and that in the ink cartridge (main tank) 76. The negative pressure enables the recording head 10 to stably discharge ink droplets.

Next, how to assist the ink feeding in the ink supply system is described with reference to FIGS. 10A and 10B.

FIG. 10A illustrates a state of the flow path resistance varying unit 83 when the recording head 10 is stopped (i.e., when ink droplets are not being discharged from the recording head 10) or when the discharged flow rate from the recording head 10 is small. In this state, the valve body 88 is disposed on the side of the port 86*b* (on the lower side).

In this state, as illustrated in FIG. 10A, when a comparison is made between a gap "Gb" formed between the tube member 87 and the valve body bottom part 88*b* of the valve body 88 and a gap "Gt" formed between the tube member 87 and the valve body top part 88*t* of the valve body 88, the gap "Gb" is larger (wider) than the gap "Gt". Further, as illustrated in FIG. 9, there are the liquid (ink) supply tube (first flow path) 71 having high fluid resistance and the filter 109 beyond the port 86*a*. Because of the features, the ink that is fed by the pump (assist pump) 78 and that is indicated in an arrow "Qa" flows towards the port 86*b* side where the ink is more likely to flow (as indicated in an arrow "C"). As a result, most of the ink pumped (fed) by the pump (assist pump) 78 may circulate in a loop between the pump unit 80 and the flow path resistance varying unit 83, which does not influence the pressure to the recording head 10.

On the other hand, FIG. 10B illustrates a state of the flow path resistance varying unit 83 when the discharged flow rate from the recording head 10 is large. In this state, as illustrated in FIG. 10B, due to the discharge of the ink droplets from the recording head 10, ink in the tube member 87 flows upward as indicated in arrows "Qh". Due to this ink flow, the valve body 88 is moved upward towards the port 86*a* side (first flow path side). Due to this movement of the valve body 88, the valve body bottom part 88*b* of the valve body 88 is moved and disposed in a narrow diameter section (i.e., the internal flow path 87*b* of the tube member 87 or the second throttling part 182) where the internal flow path 87*a* is narrower. In this state, a gap between the tube member 87 and the valve body bottom part 88*b* of the valve body 88 is reduced to "Gb1". In this state, the ink that is fed by the pump (assist pump) 78 and that is indicated in an arrow "Qa" is to flow through the small (narrow) gap "Gb1" as indicated in an arrow "D", which generates pressure. This pressure may reduce the pressure loss generated when ink flows in the recording head 10 and enables a larger flow rate of ink.

According to this embodiment of the present invention, the larger the pressure loss becomes in response to the increase of the discharged flow rate from the recording head 10, the longer the length along the ink flow direction becomes where the outer circumference surface of the valve body bottom part 88*b* of the valve body 88 faces the internal flow path 87*b* of the tube member 87 (i.e., the longer the length of the second throttling part 182 becomes). As a result, the length of the narrower gap "Gb1" between the valve body bottom part 88*b* of the valve body 88 and the tube member 87 becomes longer, which accordingly improve the effect of increasing the pressure generated by the pump (assist pump) 78. By using this feature, a stable ink supply may be automatically achieved with a simple configuration without performing conventional complicated control of the flow rate adjustment valve using an actuator Further, in the flow path resistance varying unit 83, while the ink is fed by the pump (assist pump) 78, the valve body 88 is moved and disposed at a position which is determined based on the balance between the downward force caused by the ink flow in the arrow "D" direction and the upward force caused by the discharge of the ink droplets from the recording head 10. Therefore, by designing the flow path resistance varying unit 83 in a manner such that the valve body 88 is to be disposed (balanced) at a position lower than the upper dead point as illustrated in FIG. 10B under the condition that the maximum ink droplets are to be discharged from the recording head 10, it may become possible to ensure the communication between the recording head 10 and the ink cartridge (main tank) 76 when ink is discharged from the recording head 10, and use the stable water head difference.

Figure 11:
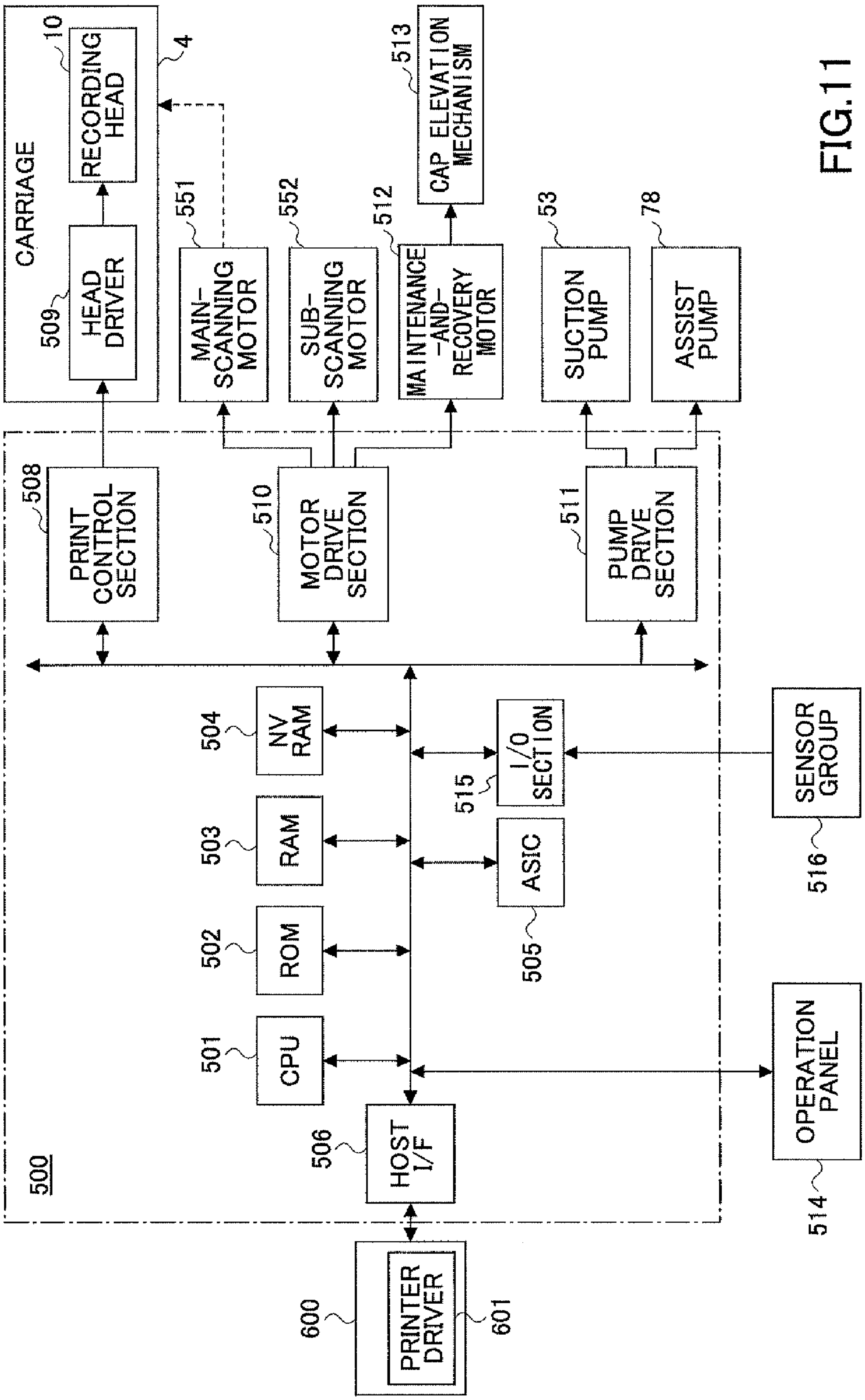
FIG. 11 is a block diagram schematically illustrating a control section of the image forming apparatus according to the first embodiment of the present invention.

Next, an exemplary configuration of a control section of the image forming apparatus according to an embodiment of the present invention is described with reference to FIG. 11. FIG. 11 is a schematic block diagram of a control section 500. As illustrated in FIG. 11, the control section 500 includes a CPU (Central Processing Unit) 501, a ROM (Read Only Memory) 502, a RAM (Random Access Memory) 503, a rewritable non-volatile memory (NVRAM) 504, and an ASIC (Application Specific Integrated Circuit) 505. The CPU 501 controls the entire operations of the image forming apparatus including an assist operation and a maintenance-and-recovery operation. The ROM 502 stores a program to be executed by the CPU 501 and necessary fixed data. The RAM 503 temporarily stores, for example, image data. The NVRAM 504 is used for storing data while the power of the apparatus is turned OFF. The ASIC performs various signal processing on the image data, image processing such as rearranging data, and a process on input and output signals for controlling the entire apparatus.

Further a print control section 508, a head driver (driver IC) 509, a main-scanning motor 551, a sub-scanning motor 552, a motor drive section 510, a pump drive section 511, a maintenance-and-recovery motor 512, the cap elevation mechanism 513 and the like are provided. The print control section 508 drives and controls the recording head 10 in response to the print data. The head driver (driver IC) 509 drives the recording head 10 mounted on the carriage 4. The main-scanning motor 551 is provided to move and scan the carriage 4. The sub-scanning motor 552 is provided to drive and rotate the feeding roller 21 feeding the sheet 20. The motor drive section 510 drives the maintenance-and-recovery motor 512 that operates the cap elevation mechanism 513 lifting up and down the cap members 52*a* and 52*b* and the wiping member 57 of the maintenance-and-recovery mechanism 51. The pump drive section 511 drives the suction pump 53 of the maintenance-and-recovery mechanism 51 and the pump (assist pump) 78.

Further, the control section 500 is connected to an operation panel 514 to input and display necessary data for the apparatus.

The control section 500 further includes a host I/F (interface) 506 to transmit and receive data and a signal to and from a host 600. The host I/F 506 receives print data from a host such as an imaging device like a digital camera or the like via a cable or a network.

Further, the CPU 501 of the control section 500 reads out and analyzes the print data in a receiving buffer of the host I/F 506, and the ASIC 505 performs necessary image processing and rearranging processes. Then the processed image data (print data) are transmitted from the print control section 508 to the head driver (driver IC) 509. In this case, the dot pattern data for image output are generated in a printer driver 601 of the host 600.

The print control section 508 transmits not only the print data in a form of serial data but also a transmission clock, a latch signal, a control signal and the like necessary for transmitting the print data and ensuring the transmission of the print data to the head driver (driver IC) 509. The head driver (driver IC) 509 drives the heating body 14 (see FIG. 4) based on the print data that are input in a form of serial data and that correspond to one line of the recording heads 10.

A I/O (input/output) section 515 acquires data from a sensor group 516 mounted in the apparatus and extracts necessary data to control the printer, so that the extracted data are used to control the print control section 508 and the motor drive section 510. The sensor groups 516 includes various sensors such as an optical sensor to detect the position of the sheet, a thermistor to monitor a temperature in the apparatus, a sensor to detect the voltage of a charged belt, and an interlock switch to determine whether the cover is open. As described above, the I/O section 515 performs processing on various sensor data. The I/O section 515 may further receive a detection signal from a temperature and humidity sensor detecting environmental conditions (temperature and humidity) and a detection signal from a full-tank detection signal detecting that a waste tank 56 is filled up.

Figure 12:
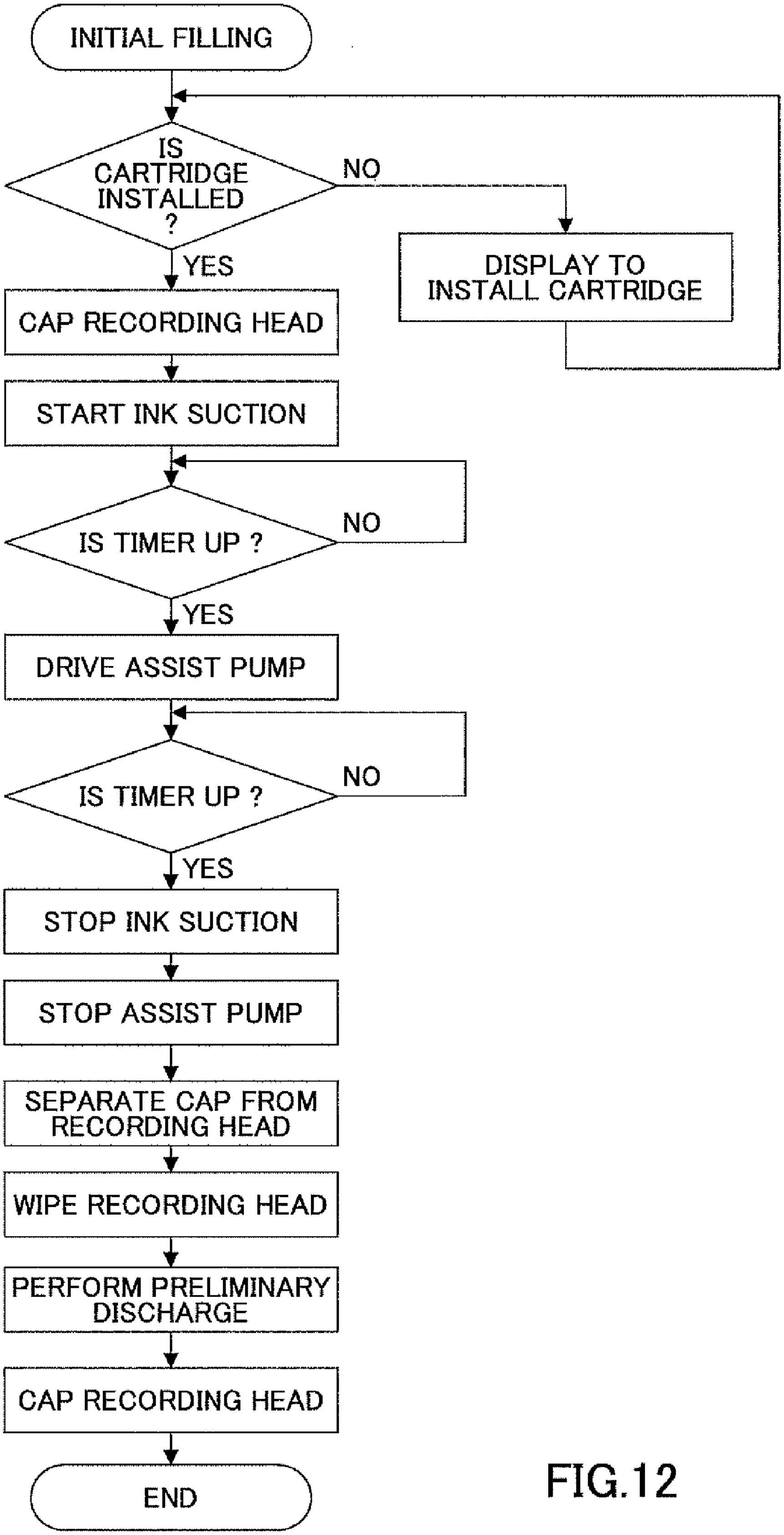
FIG. 12 is a flowchart illustrating an initial ink filling operation according to the first embodiment of the present invention.

Next, an initial ink filling operation using the above ink supply system is described with reference to the flowchart of FIG. 12.

After determining that the ink cartridge (main tank) 76 has been attached, the nozzle surface of the recording head 10 is capped with the cap member 52 of the maintenance-and-recovery mechanism 51 (capping condition). During the capping condition, the suction pump 53 is driven to suction air inside the ink supply path through the nozzle of the recording head 10 (start nozzle suction (ink suction)). This nozzle suction operation is continued until a predetermined time period has elapsed since the start of the nozzle suction operation. By performing the nozzle suction operation for the predetermined time period, ink in the ink cartridge (main tank) 76 reaches (flows into) the first flow path (liquid (ink) supply tube) 71.

After that, when determining that a predetermined time period has elapsed since the start of the nozzle suction operation (when timer is up), the motor 82 is driven to drive the pump (assist pump) 78. At this timing, the ink supply path is already formed as illustrated in FIG. 9. Therefore, by driving the pump (assist pump) 78, ink is fed in the Qa arrow direction towards the flow path resistance varying unit 83. By doing this, air in the third flow path 61 and 62 is fed to the flow path resistance varying unit 83 and is replaced by ink.

After that, when determining that a predetermined time period has elapsed (at the timing when timer is up), both the suction pump 53 and the pump (assist pump) 78 are stopped. At this timing, the entire ink supply path is filled with ink.

After that, the cap member 52 of the maintenance-and-recovery mechanism 51 is released (separated) from the nozzle surface of the recording head 10 (capping condition is released), and the nozzle surface of the recording head 10 is wiped by a wiping member 57 of the maintenance-and-recovery mechanism 51. Then, the recording head 10 is driven to discharge a predetermined number of droplets which do not contribute to forming any meaningful image from the nozzle (preliminary discharge of recording head). By doing this, a desired meniscus is formed in the nozzles of the nozzle surface.

Then, the nozzle surface of the recording head 10 is capped with the cap member 52 of the maintenance-and-recovery mechanism 51 (head capping).

By doing in this way, the initial ink filling operation is finished. In flowchart of FIG. 12, a case is illustrated where the pump (assist pump) 78 is continuously driven until the nozzle suction is stopped. However alternatively, the initial ink filling operation may be performed by stopping the pump (assist pump) 78 when the replacement of air in the third flow path 61 and 62 and the transverse hole (port) 86*c* by ink is completed. However, in the example of FIG. 12, the pump (assist pump) 78 is driven while the first flow path (liquid (ink) supply tube) 71 and the recording head 10 are being filled with ink. Therefore, the initial ink filling operation may be completed in a shorter time period.

Figure 13:
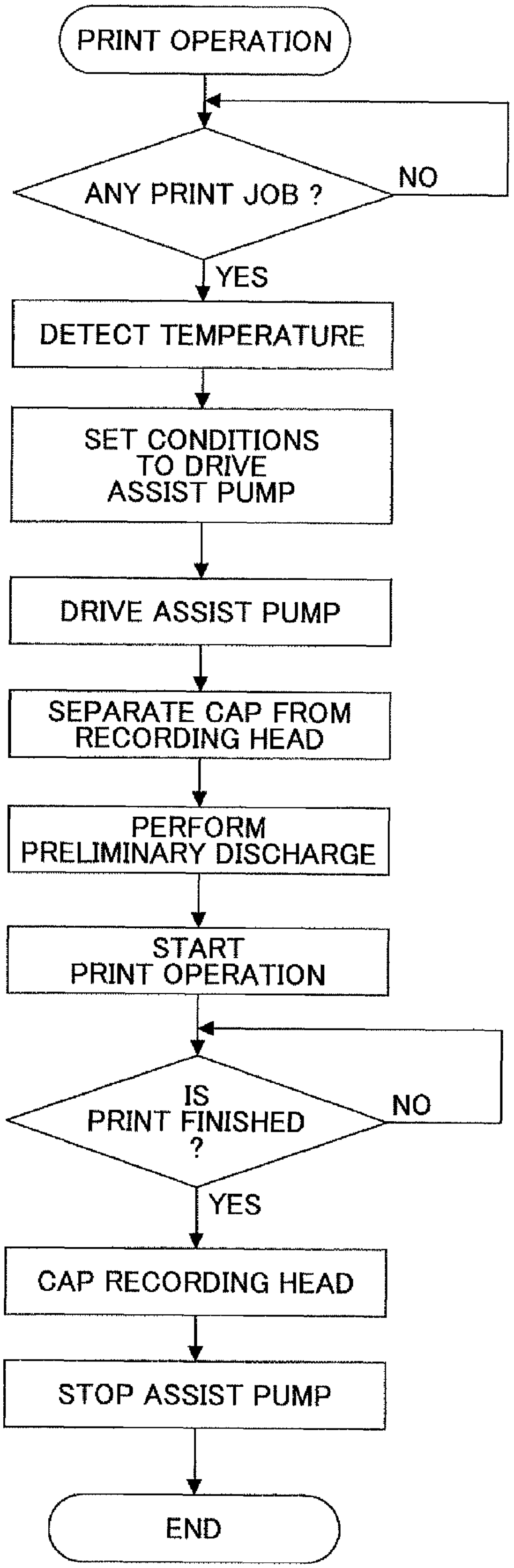
FIG. 13 is a flowchart illustrating a printing operation according to the first embodiment of the present invention.

Next, a printing operation is described with reference to the flowchart of FIG. 13.

After a print job signal is received, first, a temperature in the apparatus is detected by a temperature sensor 27 (FIG. 2) so that the ink temperature is estimated. In the example of FIG. 2, the temperature sensor 27 is mounted in the carriage 4. However alternatively, the temperature sensor 27 may be disposed at another position such as on the ink cartridge (main tank) 76 or on the recording head 10. Otherwise, the temperature sensor 27 may be disposed in the ink supply path so as to directly detect the ink temperature.

Then, based on the detected (estimated) ink temperature, a flow rate to be fed by the pump (assist pump) 78 is determined, so that the pump (assist pump) 78 is driven to feed the determined flow rate. After that, the cap member 52 of the maintenance-and-recovery mechanism 51 is released (separated) from the nozzle surface of the recording head 10 (capping condition is released). Then, the recording head 10 is driven to discharge a predetermined number of droplets from the nozzles (preliminary discharge of recording head). After that, printing is started.

During that time, the pump (assist pump) 78 is being driven. Therefore, even when ink having high viscosity is used in a system having a long liquid (ink) supply tube (first flow path) 71, it may become possible to adequately reduce the pressure loss generated during ink supply. As a result, it may become possible to perform good printing while preventing the ink supply shortage.

After the printing operation is finished, the carriage 4 is moved back to and stopped at its predetermined position (home position) in the apparatus. Then, the nozzle surface of the recording head 10 is capped with the cap member 52 of the maintenance-and-recovery mechanism 51 (head capping). Then, the pump (assist pump) 78 is stopped.

Herein alternatively, the pump (assist pump) 78 may be stopped immediately after the printing operation is finished. Further, in the above description, the flow rate to be fed by the pump (assist pump) 78 is controlled based on the temperature. However alternatively, regardless of the temperature, depending on the requirement of ink supply or the like, the ink may be fed based on the flow rate that may not cause the ink supply shortage at the lowest possible temperature.

In such a printing operation, ink supply shortage may occur due to the fluid resistance of the ink supply paths in cases such as when the viscosity of ink to be discharged is high, when fluid resistance of the liquid (ink) supply tube (first flow path) 71 is high, when the tube is thin or long, and when an flow rate of discharged ink is large. More specifically, major parts responsible for impeding the ink supply in the ink supply system are the liquid (ink) supply tube (first flow path) 71, the filter 109, and a joint section 89 (FIG. 9).

For example, in a case where a wide image forming apparatus has the diameter and the length of the liquid (ink) supply tube (first flow path) 71 of 2.5 mm and 2,500 mm, respectively, when ink having high viscosity of 16 cP is discharged, the fluid resistance of the liquid (ink) supply tube (first flow path) 71 becomes 4.2e10 Pa·s/m$^3$. Further, in this embodiment, it is assumed that the fluid resistances of the filter 109 and the joint section 89 are 1e10 Pa·s/m$^3$ and 2e9 Pa·s/m$^3$, respectively.

In this case, it is assumed that the limit value of the pressure loss so as to stably discharge ink from the recording head 10 is 2.5 kPa. In this case, when ink is continuously discharged from all the nozzles, the flow rate of discharged ink becomes 0.1 cc/s. On the other hand, in a case where a natural supply method without generating assist pressure (without using the assist pump 78) is employed, when ink having a viscosity of 16 cP is discharged at the flow rate of 0.1 cc/s, a pressure loss of 5.4 kPa is generated, which may prevent continuous ink discharge.

As described above, when the pressure loss is increased due to the fluid resistances in the ink supply system and refilling shortage occurs, the pump (assist pump) 78 is then driven to feed ink from the third flow path 43 (61 and 62) in the Qa direction. Herein, a symbol "Qa" denotes an assist flow rate or a liquid (ink) flow for assist. However, for explanatory purposes, the symbol "Qa" is also used as a sign of an arrow. By feeding liquid (ink) by the pump (assist pump) 78, the ink supply shortage may be compensated for (refill assist).

Figure 14:
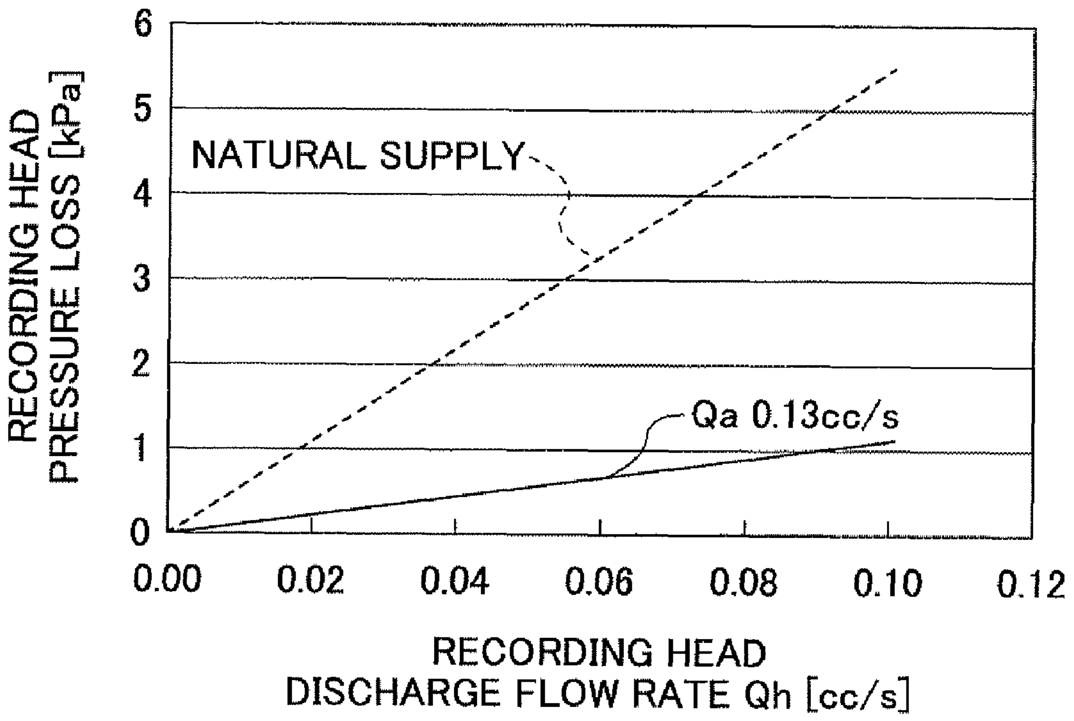
FIG. 14 is a graph illustrating relationships among a recording head discharge flow rate, a pump supply flow rate (assist flow rate), and a recording head pressure (pressure loss) according to the first embodiment of the present invention.

FIG. 14 is a graph illustrating an example of a relationship between a discharged flow rate of the recording head 10 and the pressure loss at the recording head 10 in the ink supply system when a supply flow rate (assist flow rate) of the pump (assist pump) 78 varies. In other words, FIG. 14 illustrates the change of the pressure loss in the ink supply system in response to the discharged flow rate at the recording head 10 in a range from 0 cc/s to 0.1 cc/s when the supply flow rate (assist flow rate) of the pump (assist pump) 78 is set to 0.13 cc. As described above, when ink is supplied without any assistance (in natural supply), the pressure loss at the recording head 10 may reach up to approximately 5.4 kPa. As a result, ink may not be continuously (stably) discharged, and namely, ink discharge failure may occur. However, when the pump (assist pump) 78 is used to assist the ink feeding, the pressure loss is reduced to as low as approximately 1.1 kPa or less, which enables the recording head 10 to continuously (stably) discharge ink droplets.

Further, as described above, the image forming apparatus according to this embodiment of the present invention may discharge four color inks for color printing. To that end, there are provided four separate ink supply systems each having the configuration as illustrated in FIG. 9. In this case, for example, four separate actuators such as motors corresponding to four pumps (assist pumps) 78 may be provided, so that the actuators can be independently controlled to respond to the ink discharge flow rate of the respective recording heads 10. However alternatively, as illustrated in FIG. 7, only one motor (actuator) 82 may be provided for the four pumps (assist pumps) 78 (i.e., pumps (assist pumps) 78K, 78C, 78M, and 78Y) corresponding to the number of color inks.

When an image is formed by discharging plural colors, the flow rates of color inks discharged from the recording heads 10 may vary (different from each other) depending on an image to be formed. For example, there may be a case where ink is discharged from all nozzles of a certain recording head but no ink is discharged from any nozzle of another recording head. Even in this case, in the ink supply system according to this embodiment of the present invention, the fluid resistances of the flow path resistance varying units 83 automatically vary in response to the flow rate of the color inks discharged from the respective recording heads 10. Because of this feature, it is not necessary to control the pumps (assist pumps) 78 in response to the flow rate of ink discharged from the respective recording heads 10. Namely, as control of the ink supply system according to this embodiment of the present invention, less assist (pressure) is automatically provided (generated) for the recording head requiring less assist (pressure) due to small flow rate of ink discharged from the recording head. On the other hand, greater assist (pressure) is also automatically provided (generated) for the recording head 10 requiring greater assist (pressure) due to large flow rate of ink discharged.

As described above, according to this embodiment of the present invention, even in a system having plural ink supply systems due to, for example, the use of plural color inks for color printing, it may be possible to collectively control all the pumps of the respective ink supply systems with only one actuator. Because of this feature, the configuration of the apparatus and the control method may be simplified, and the cost and the size of the apparatus may be accordingly reduced.

Generally, the viscosity of liquid varies depending on the liquid temperature. Therefore, it is preferable to control the pump (assist pump) 78 to determine the flow rate of liquid (ink) fed (assisted) by the pump (assist pump) 78 based on feedback control using a temperature value such as an ambient temperature value or an inside temperature value of the apparatus measured using the temperature sensor 27 in FIG. 2, an ink (liquid) temperature value, and any of the respective estimated temperature values thereof. By doing this, it may become possible to provide an apparatus that can be easily operated in response to all possible temperatures.

Further, a pressure sensor may be installed in the ink supply path, so that the pressure change can be measured when a predetermined flow rate of ink is discharged from the recording head 10. Based on the measurement result, the viscosity of the liquid (ink) corresponding to the pressure loss due to the liquid (ink) may be detected. Then, based on the detected viscosity value, a parameter for controlling the pump (assist pump) 78 may be changed, thereby enabling using various liquids having different viscosities. Further, alternatively, the parameter for controlling the pump (assist pump) 78 may be input by a user while the user monitors the discharge condition. By having this configuration, the mechanism of detecting the fluid viscosity may be omitted, thereby simplifying the configuration of the apparatus.

Figure 15:
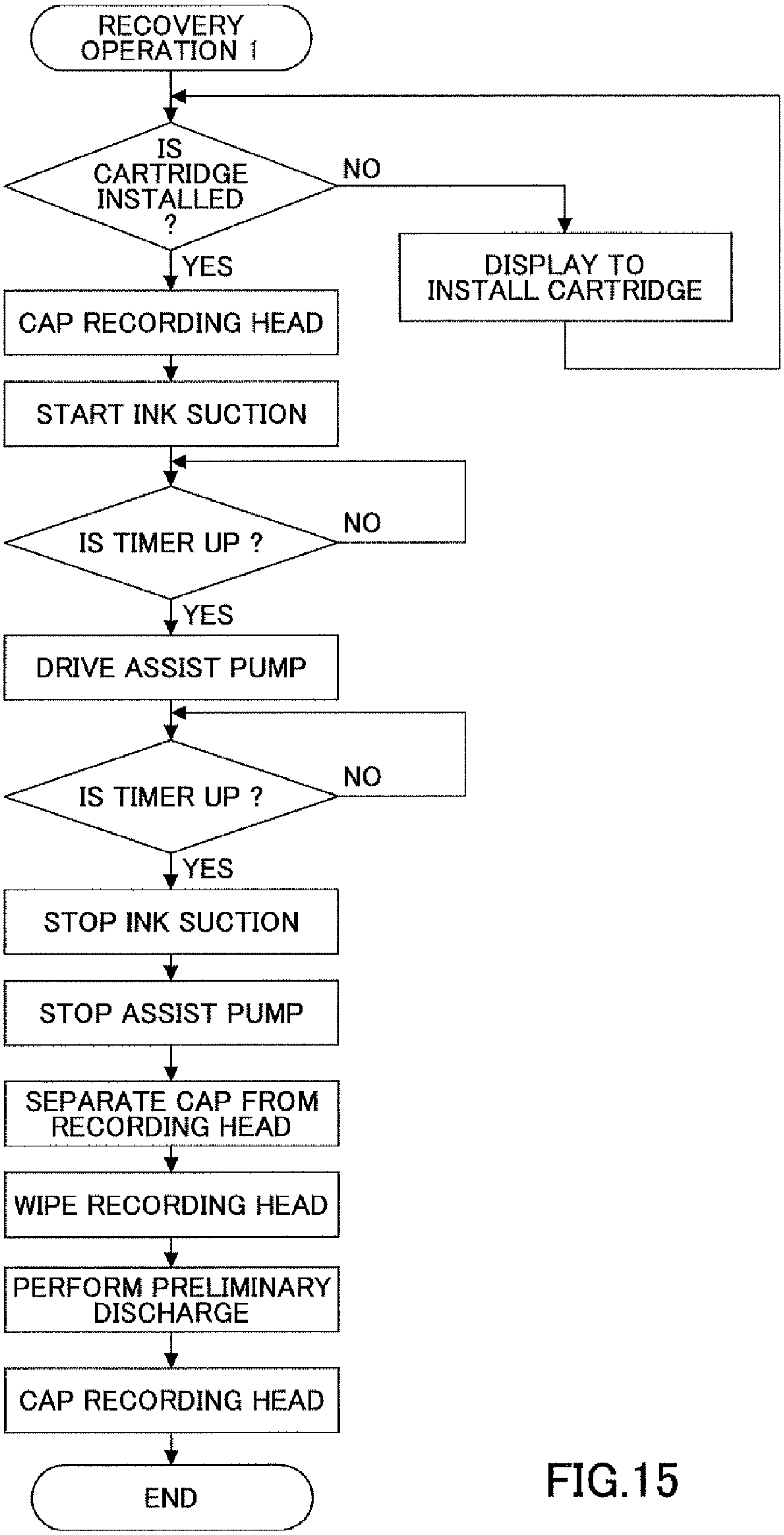
FIG. 15 is a flowchart illustrating a recovery operation according to the first embodiment of the present invention.
Figure 16B:
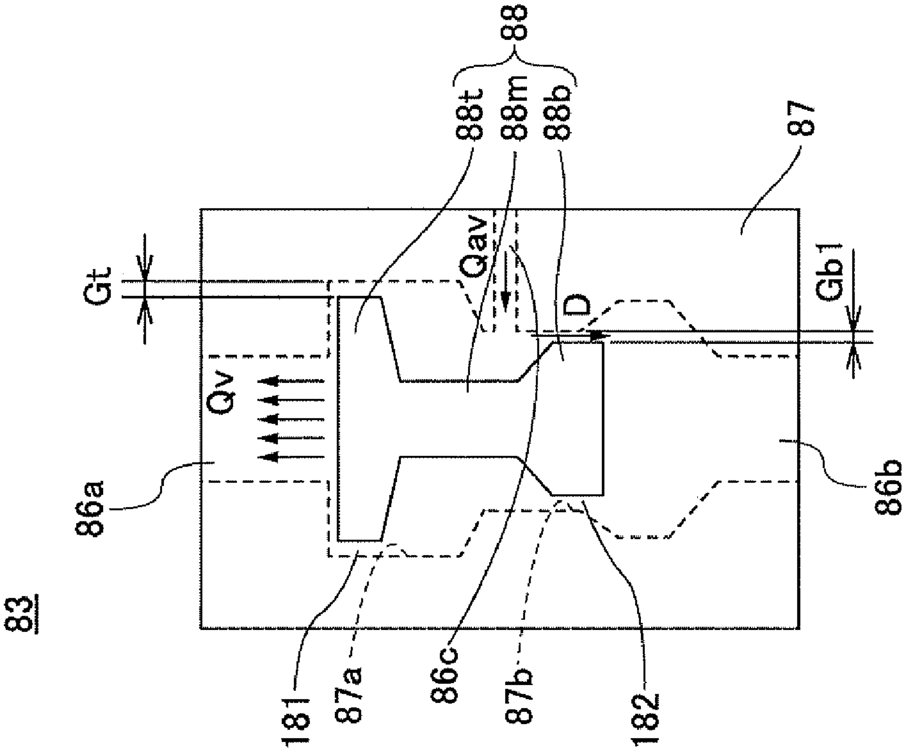
FIGS. 16A and 16B are schematic cross-sectional views illustrating an example of the flow path resistance varying unit used in the ink supply system according to the first embodiment of the present invention.

Next, a recovery operation in an image forming apparatus according to this embodiment of the present invention is described with reference to the flowchart of FIG. 15 and schematic drawings of FIGS. 16A and 16B.

First, it is determined whether the ink cartridge (main tank) 76 is installed in the cartridge holder 77. When determining that the ink cartridge (main tank) 76 is not installed in the cartridge holder 77, a message requesting for installing the ink cartridge (main tank) 76 is displayed on the operation panel 514.

On the other hand, when determining that the ink cartridge (main tank) 76 is installed in the cartridge holder 77, the cap member 52 of the maintenance-and-recovery mechanism 51 is lifted up to cover the nozzle surface of the recording head 10 (head capping). Then, the suction pump 53 is driven (operated) to provide (generate) negative pressure in the cap member 52, so as to start ink suction (nozzle suction) and ink discharge through the nozzle 15.

Figure 16A:
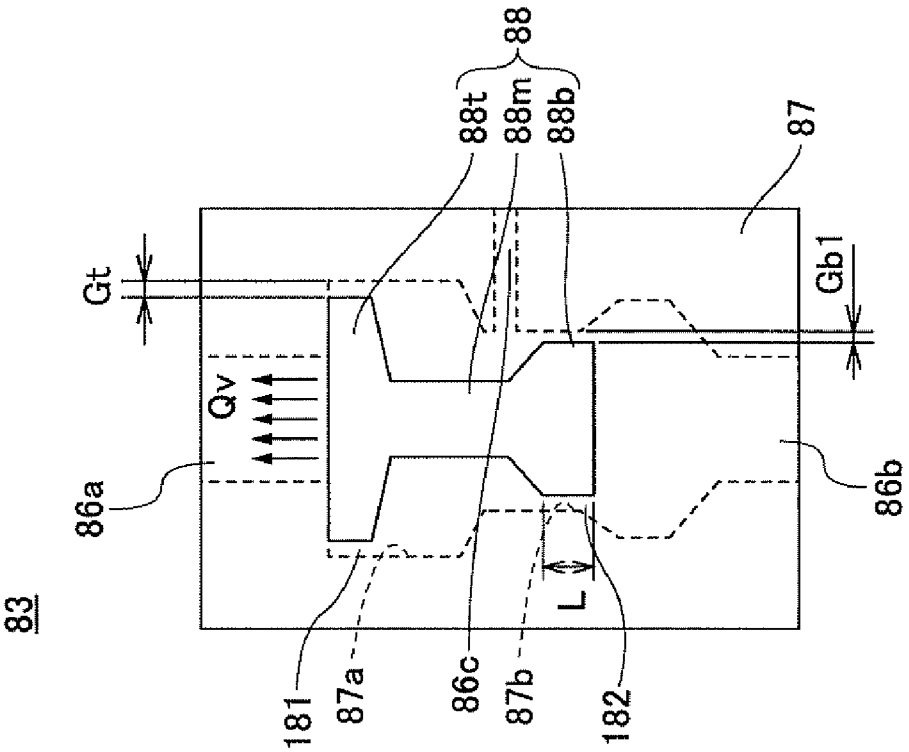

By doing this, the flow speed (flow rate) of ink in the liquid (ink) supply tube (first flow path) 71 is increased, and as illustrated in FIG. 16A, the valve body 88 of the flow path resistance varying units 83 is moved upward. In this case, the flow rate "Qv" when the valve body 88 is absorbed (moved upward) is much larger than the maximum discharge flow rate in normal printing operation. Therefore, the valve body 88 is moved upward to the highest possible position in its movable range. As a result, the valve body 88 seals the port 86*a* and a choke condition is established, so that the negative pressure in the cap member 52 is suddenly (further) increased. Namely, in this first embodiment of the present invention, the valve body top part 88*t* of the valve body 88 (first valve section) serves also as means (sealing member) for sealing (sealing unit) (disconnecting a fluid communication) between the liquid (ink) supply tube (first flow path) 71 and the second flow path 60 to seal the first flow side.

Further, in this case, the valve body bottom part 88*b* of the valve body 88 is disposed (inserted) in the narrow diameter section (i.e., the internal flow path 87*b* of the tube member 87 or the second throttling part 182) where the internal flow path 87*a* is narrower, and as a result, the length "L" (see FIG. 16A) of the narrower gap "Gb1" becomes the longest length. Then, the ink suction (nozzle suction) is continued until a predetermined time period has passed since the start of the ink suction (until timer is up) to accumulate the negative pressure in the cap member 52. After that, as illustrated in FIG. 16B, the pump (assist pump) 78 is driven to supply ink at the flow rate "Qav" to the flow path resistance varying units 83. When the ink having the flow rate "Qav" further flows through the narrower gap "Gb1" having the length "L" and the maximum throttle value in the arrow "D" direction, a positive pressure is effectively generated in the flow path resistance varying units 83.

In this case, by setting the flow rate "Qav" as a sufficiently large value, a force pushing down the valve body 88 can be obtained while the positive pressure in the flow path resistance varying units 83 is increased. Due to the obtained force, the valve body 88 is moved downward to an intermediate position. Due to the downward movement of the valve body 88, the choke condition is released. As a result, ink is suddenly supplied from the flow path resistance varying units 83 where the positive pressure is accumulated to the recording head 10 where the negative pressure is accumulated, thereby exhausting bubbles and foreign matter included in ink through the nozzle 15.

Then, after a predetermined time period has passed, the operation (drive) of the suction pump 53 is stopped to stop the ink suction (nozzle suction). Next, after the operation (drive) of the pump (assist pump) 78 is stopped, the cap member 52 is separated from the nozzle surface of the recording head 10 (capping condition is released). Next, the nozzle surface of the recording head 10 is wiped (cleaned) by using the wiping member 57 of the maintenance-and-recovery mechanism 51. Then, after ink (liquid) droplets irrelevant to image forming are discharged (preliminary discharge) from the recording head 10, the cap member 52 is lifted up and covers the nozzle surface of the recording head 10 (head capping) to complete the recovery operation.

Next, a relationship between the change of the pressure in the cap member 52 and the timings of the operations of the pump (assist pump) 78 is described with reference to FIG. 17.

Figure 17:
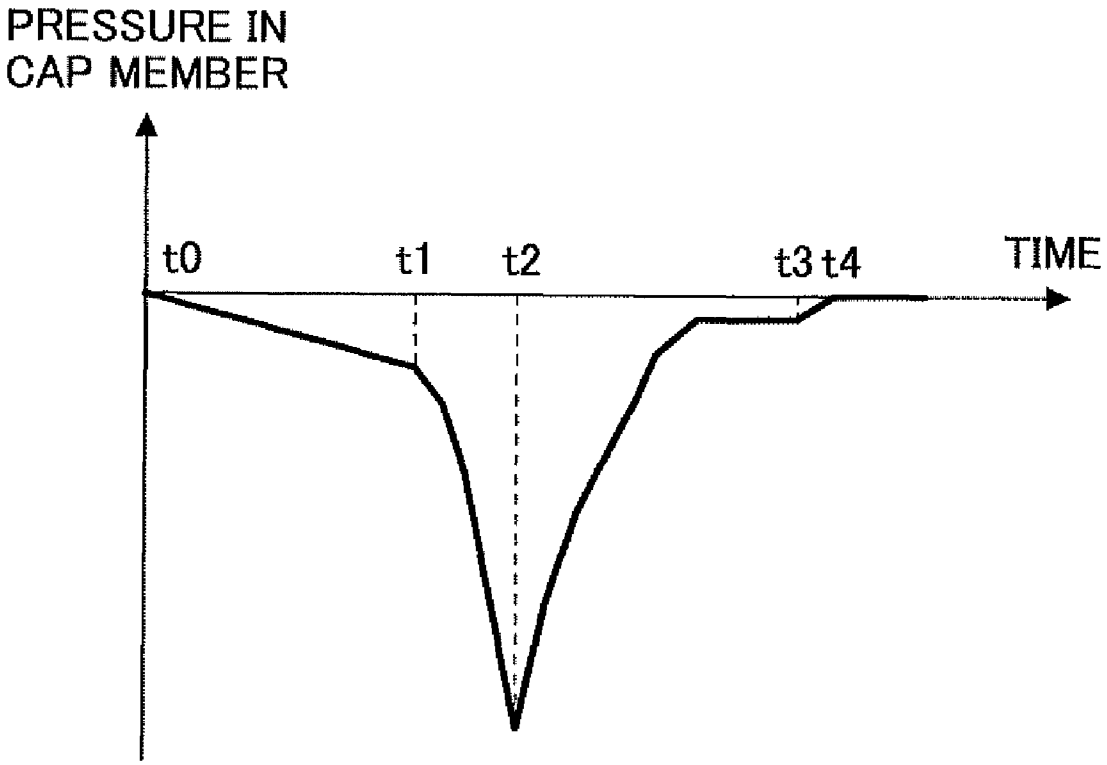
FIG. 17 is a graph illustrating a change of a pressure in a cap while starting and stopping an assist pump according to the first embodiment of the present invention.

As illustrated in FIG. 17, at the timing "t0", the operation (drive) of the suction pump 53 is driven to start a suction operation. After that, the pressure in the cap member 52 starts decreasing (i.e., the negative pressure in the cap member 52 starts increasing). Then, at the timing "t1", the valve body 88 is in contact with the tube member 87 and stops moving upward. From the timing "t1", the choke condition is established, and as a result, the pressure in the cap member 52 suddenly starts decreasing greatly (i.e., the negative pressure in the cap member 52 suddenly starts increasing greatly). Then, at the timing "t2", the operation (drive) of the pump (assist pump) 78 is started. By starting the operation of the pump (assist pump) 78, the choke condition is released and ink is supplied to the recording head 10 suddenly. As result, the pressure in the cap member 52 is increased and then becomes stable (stable condition). Then, at the timing "t3", the suction operation is stopped. Next, at the timing "t4", the operation (drive) of the pump (assist pump) 78 is stopped.

As described above, in the ink supply system of the image forming apparatus according to this embodiment of the present invention, the flow path resistance varying unit 83 functions not only as a pressure adjustment valve for the refill assist in printing but also as a choke valve in a recovery operation for recovering the recording head 10. Further, in a similar manner, the pump (assist pump) 78 functions not only as a pump for the refill assist but also as a control means for releasing the choke condition. By having the configuration described above, it may become possible to perform a choke cleaning during the recovery operation of the recording head 10, namely it may become possible to increase the flow speed (flow rate) of the ink (liquid) in the recording head 10 to exhaust the ink (liquid) in the recording head 10 so as to improve the exhaust capability of bubbles and foreign matter included in ink.

Figure 18:
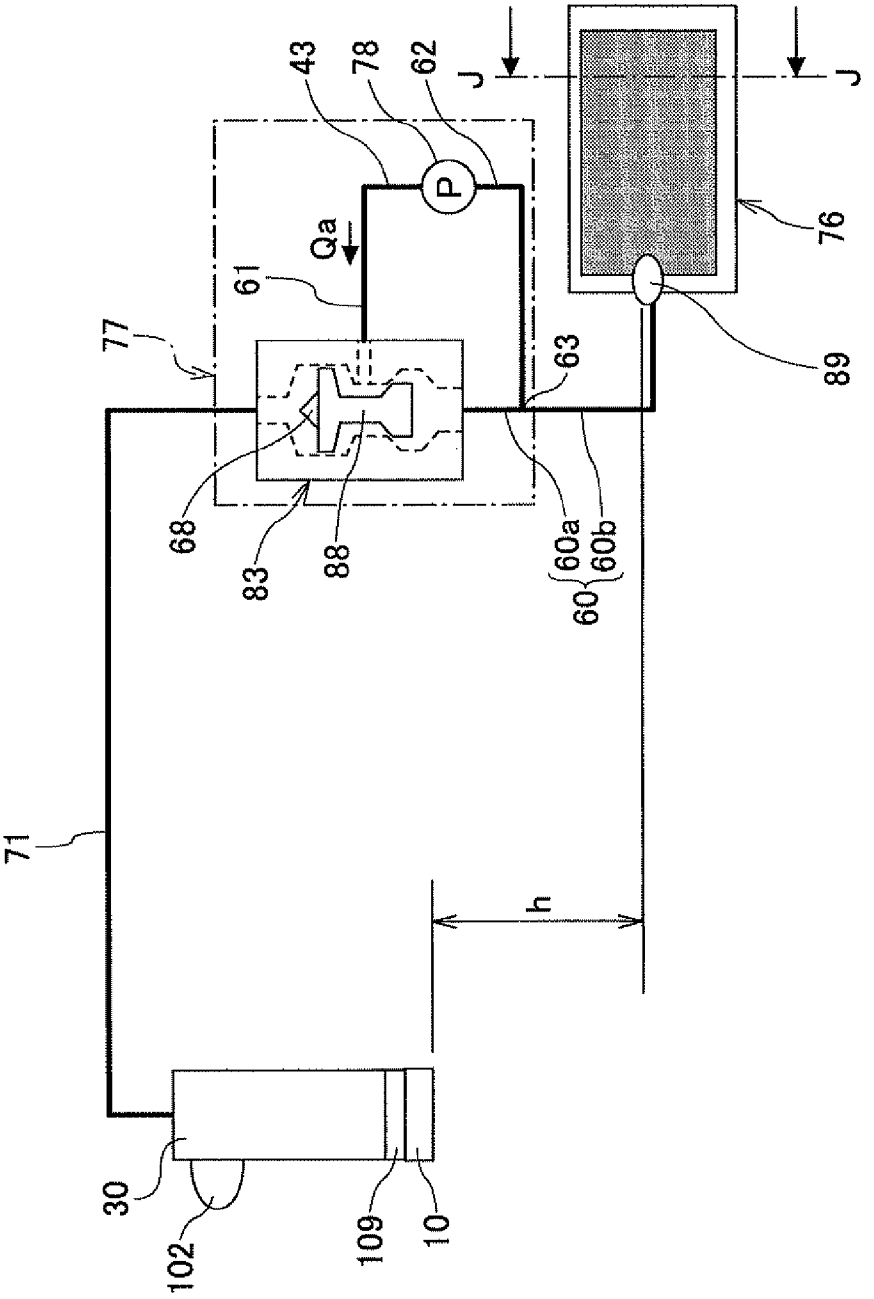
FIG. 18 is a schematic view illustrating a configuration of an ink supply system according to a second embodiment of the present invention.
Figure 19A:
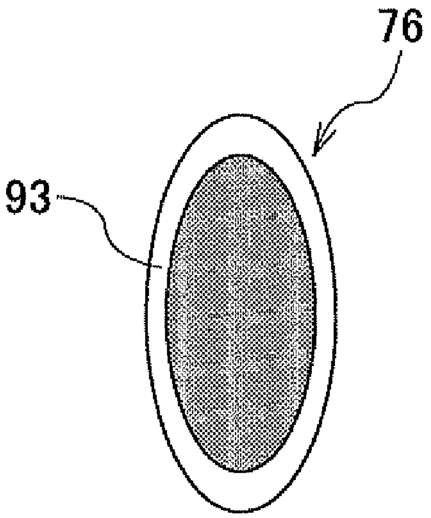
FIGS. 19A and 19B are cross-sectional views of an ink cartridge cut along a line J-J in FIG. 18.
Figure 19B:
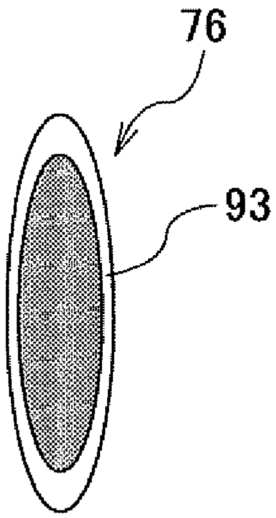
Figure 20B:
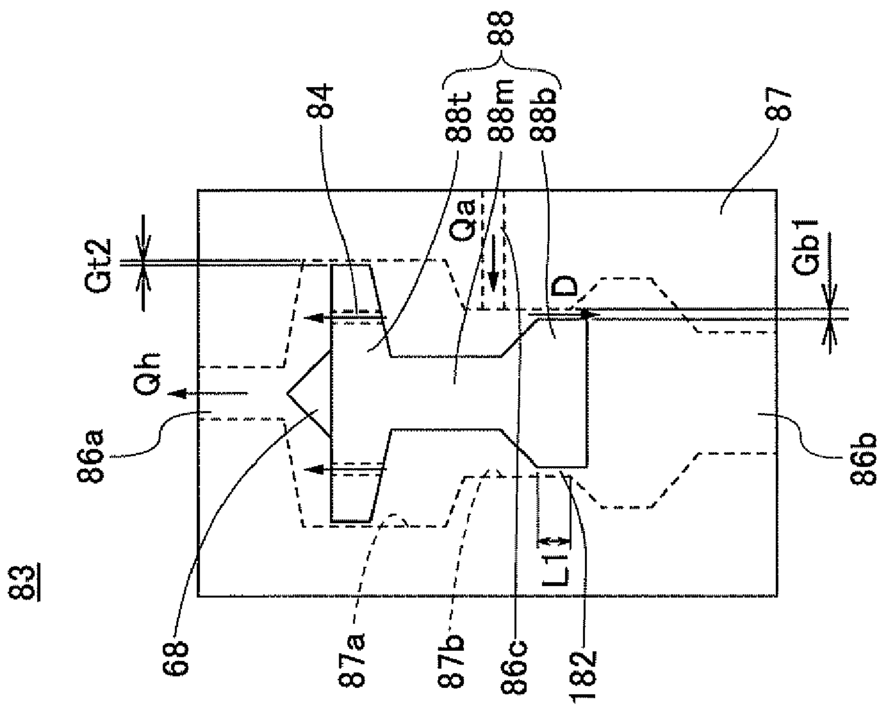
FIGS. 20A and 20B are schematic cross-sectional views illustrating an example of the flow path resistance varying unit used in the ink supply system according to the second embodiment of the present invention.
Figure 20A:
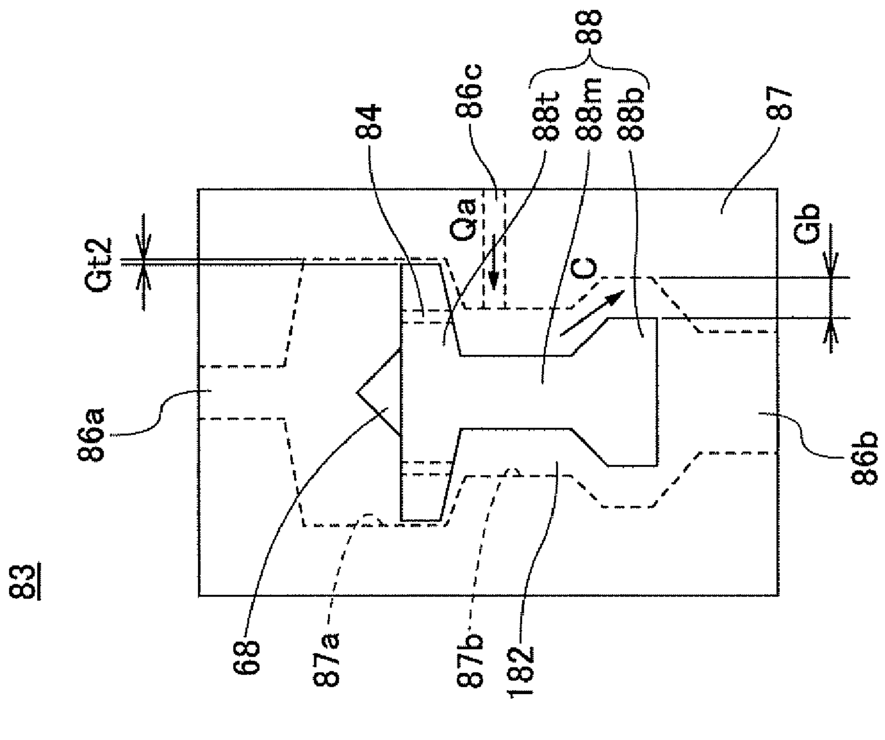
Figure 21:
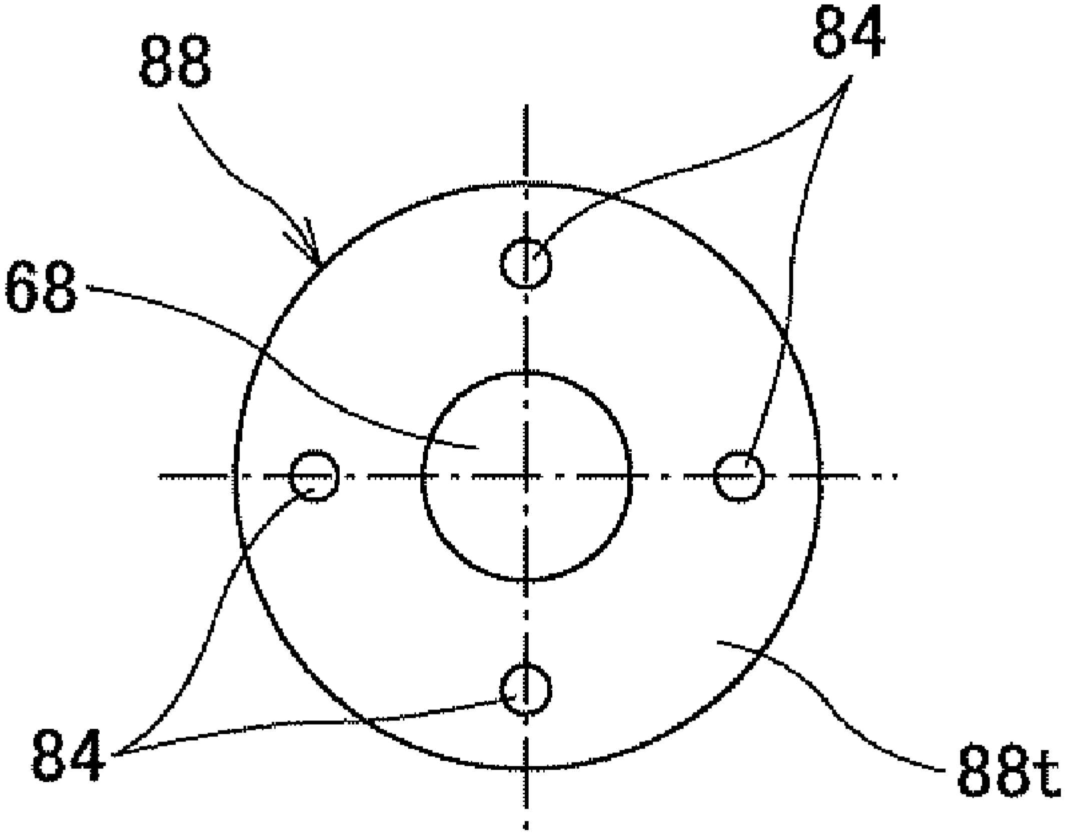
FIG. 21 is a top view of a valve body of the flow path resistance varying unit used in the ink supply system according to the second embodiment of the present invention.
Figure 22B:
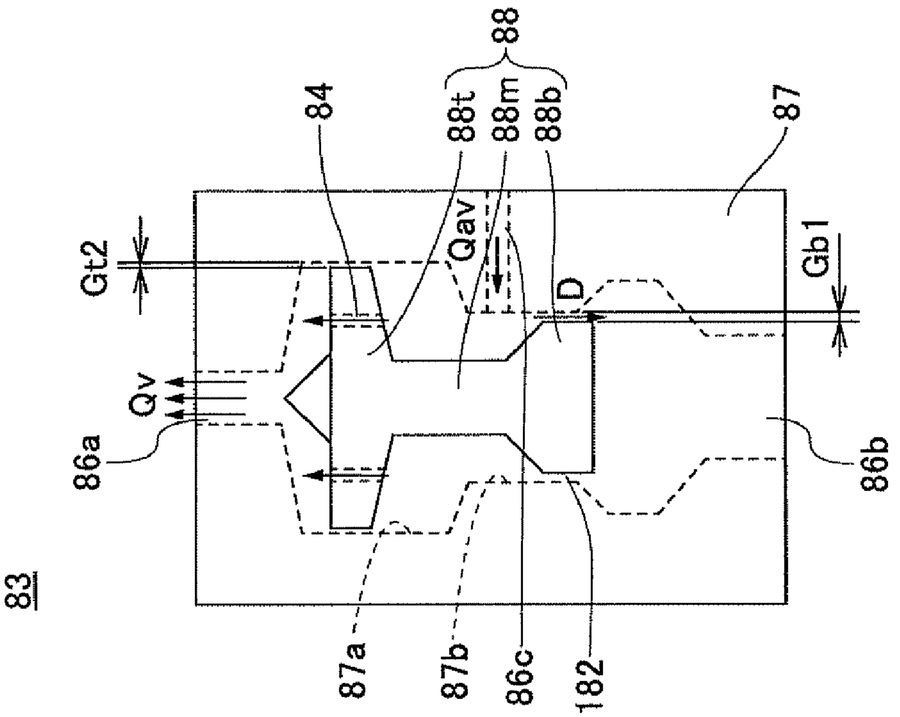
FIGS. 22A and 22B are schematic cross-sectional views illustrating operations of the flow path resistance varying unit in the recovery operation according to the second embodiment of the present invention.
Figure 22A:
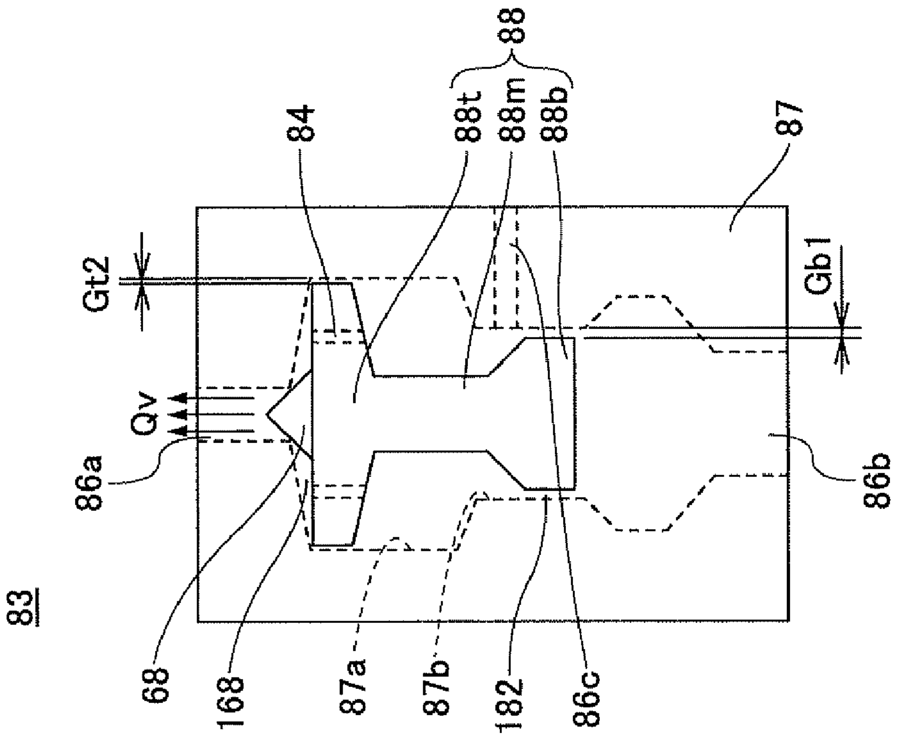

Next, an ink supply system according to a second embodiment of the present invention is described with reference to FIGS. 18 through 22. FIG. 18 schematically illustrates a configuration of the ink supply system according to the second embodiment of the present invention. FIGS. 19A and 19B are cross-sectional views cut along a line J-J in FIG. 18. FIGS. 20A and 20B are schematic cross-sectional views illustrating an example of a flow path resistance varying unit used in the ink supply system. FIG. 21 a top view of a valve body of the flow path resistance varying unit used in the ink supply system. FIGS. 22A and 22B illustrate an operation of the flow path resistance varying unit in the recovery operation.

First, the ink cartridge (main tank) 76 includes a bag member 93 made of a flexible material that can be flexibly deformed as ink is consumed. In this case, for example, the shape of the bag member 93 is changed from the state of FIG. 19A to the state of FIG. 19B. In the bag member 93 of the ink cartridge (main tank) 76, liquid (ink) is contained. The surface of the liquid (ink) is lower than that of the nozzle surface of the recording head 10.

By having the configuration of the ink 1J cartridge (main tank) 76, the ink supply system becomes a sealed system. Therefore, it may become easier to stably maintain the quality of the liquid (ink) to be supplied to the recording head 10. Further, the negative pressure at the recording head 10 is maintained by the height difference between the recording head 10 and the ink cartridge (main tank) 76. Because of this feature, a stable negative pressure may be obtained.

Further, as schematically illustrated in FIGS. 20A and 20B, the valve body top part 88*t* of the flow path resistance varying unit 83 has a larger diameter (size) than that in the first embodiment (e.g. FIGS. 10A and 10B) of the present invention. As a result, the gap "Gt2" between the valve body top part 88*t* and the internal flow path 87*a* (inner wall) of the tube member 87 becomes narrower than that ("Gt" in FIGS. 10A and 10B) in the first embodiment of the present invention (i.e., Gt2<Gt). Further, there are through holes 84 extending in the direction parallel to the axis (longitudinal) direction of the valve body 88 and formed between the upper surface and the lower surface of the valve body top part 88*t*. The through holes 84 serve as the first throttling part in this embodiment of the present invention. Further, as illustrated in FIG. 21, four through holes 84 are symmetrically disposed with respect to the circumferential direction (rotational direction) of the valve body 88 when viewed from the top.

In this ink supply system, when the valve body 88 changes its position (in up and down direction) in the flow path resistance varying unit 83, the throttle value of the second throttling part 182 between the valve body bottom part 88*b* and the internal flow path 87*a* (inner wall) of the tube member 87 accordingly changes. When the throttle value of the second throttling part 182 changes, the fluid resistance of the flow path resistance varying unit 83 accordingly changes. By changing the fluid resistance of the flow path resistance varying unit 83, the pressure value (assist pressure) to cancel (reduce) the negative pressure value may be adjusted. In this case, a force for moving the valve body 88 is generated (determined) by the throttle value of the through holes 84 which are serving as the first throttling part. By forming the first throttling part by using the through holes 84 of the valve body top part 88*t*, it may become easier to accurately form the first throttling part (throttle value). As result, it may become possible to obtain stable throttle characteristics.

Further, as described above, four through holes 84 are symmetrically disposed with respect to the circumferential direction (rotational direction) of the valve body 88. However alternatively, the diameter of the through holes 84 may become smaller and the number of the through holes 84 may be increased. Otherwise, the diameter of the through holes 84 may become larger and the number of the through holes 84 may be decreased. However, it is preferable that the through holes 84 be symmetrically disposed with respect to the circumferential direction (rotational direction) of the valve body 88 so that the valve body 88 can be moved straightly along the axis direction.

Similar to the above first embodiment of the present invention, in this second embodiment, when the valve body 88 moves in response to the ink (liquid) discharge condition from the recording head 10, the second gap between the valve body bottom part 88*b* and the internal flow path 87*a* (inner wall) of the tube member 87 accordingly changes in a range between "Gb" (FIG. 20A) and "Gb1" (FIG. 20B). By having this feature, the larger the ink (liquid) discharge amount discharged from the recording head 10 becomes (i.e., accordingly, the larger the pressure loss in the ink (liquid) supply path becomes), the higher the valve body 88 moves upward (i.e., accordingly, the greater the length "L1" of the gap "Gb1" becomes and the greater the fluid resistance becomes). As a result, a higher positive pressure is generated due to the ink (liquid) having a flow rate "Qa" fed by the pump (assist pump) 78. Due to the generated positive pressure, the pressure loss may be cancelled (reduced) and the refill operation to refill the recording head 10 with ink (liquid) to may be successfully performed.

Further, by designing the flow path resistance varying unit 83 in a manner such that the valve body 88 does not reach the upper dead point as illustrated in FIG. 20B even when ink (liquid) is discharged from the recording head 10 at the maximum flow rate, it may become possible to always maintain the fluid communication between the recording head 10 and the ink cartridge (main tank) 76. As a result, a stable water head difference may be applied between the recording head 10 and the ink cartridge (main tank) 76.

Next, the recovery operation in the second embodiment of the present invention is described.

In this second embodiment, a conical-shaped sealing rubber 68 is provided in the middle part on the upper surface of the valve body top part 88*t* of the flow path resistance varying unit 83 as a first elastic member which serves as a sealing member.

Similar to the first embodiment described above, when ink (liquid) is suctioned while the recording head 10 is covered with the cap member 52, the valve body 88 is moved upward and reaches the upper dead point as illustrated in FIG. 22A. In this condition, the sealing rubber 68 seals the port 86*a* on the liquid (ink) supply tube (first flow path) 71 side. Therefore, the liquid (ink) supply tube (first flow path) 71 is sealed and the choke condition is accordingly established.

Further, in this second embodiment, as illustrated in FIG. 22A, when the port 86*a* is sealed with the sealing rubber 68, a gap (space) 168 is formed (defined) surrounding the sealing rubber 68. Due to the gap (space) 168, the choke condition is maintained while a gap between the tube member 87 and the valve body 88 is maintained.

By having the feature, when the pump (assist pump) 78 is operated (driven) to feed ink (liquid) having flow rate "Qav" into the flow path resistance varying unit 83 as illustrated in FIG. 22B, a positive pressure is generated by the flow of ink (liquid) flowing in the arrow "D" direction through the narrower gap "Gb1" between the valve body top part 88*t* and the internal flow path 87*b*. The generated positive pressure is applied to a large area of the valve body top part 88*t* near the sealed portion (sealed by the sealing rubber 68) so as to ensure to move downward the valve body 88 and release the choke condition.

Figure 30:
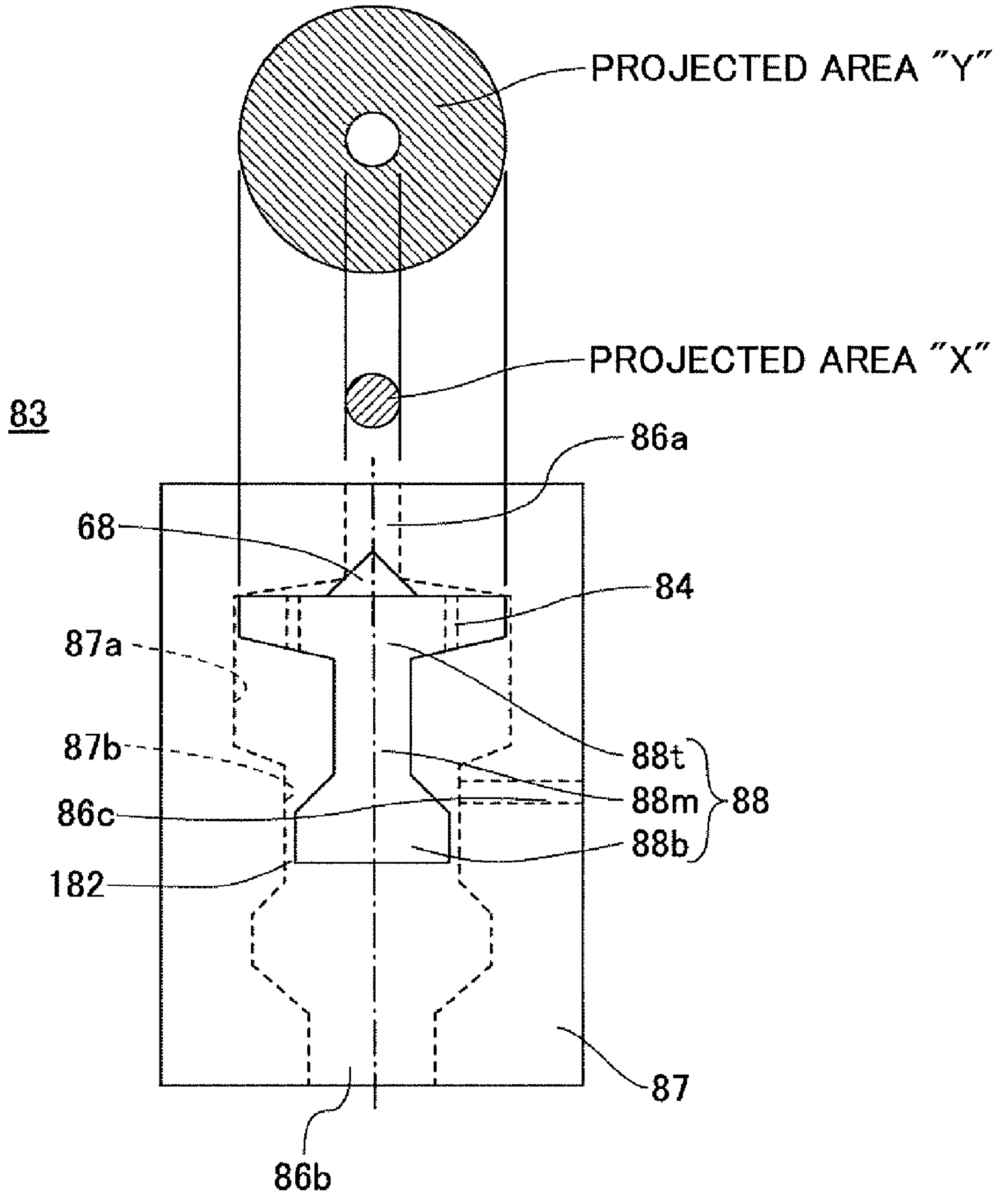
FIG. 30 is a drawing illustrating projected areas when seen from the top of the flow path resistance varying unit.

Further, in this embodiment, as schematically illustrated in FIG. 30, the flow path resistance varying unit 83 is provided in a manner such that a projected area "X" is smaller than a projected are "Y". The projected area "X" refers to the projected area of the port 86*a* when viewed in the direction parallel to the moving direction of the valve body 88. (i.e, the cross-sectional area of the port 86*a* when cut by a plane perpendicular to the direction parallel to the moving direction of the valve body 88). On the other hand, the projected area "Y" refers to the projected area determined by subtracting the projected area "X" from the projected area of an upper fluid contacting surface of the valve body top part 88*t* when viewed in the direction parallel to the moving direction of the valve body 88 (i.e., the cross-sectional area of the upper fluid contacting surface of the valve body top part 88*t* when cut by a plane perpendicular to the direction parallel to the moving direction of the valve body 88). By having this feature of the flow path resistance varying unit 83, it may become easier to move downward the valve body 88 to release the choke condition even when the positive pressure generated by the pump (assist pump) 78 is relatively small. Therefore, it may become possible to reduce the flow rate "Qav" of ink fed by the pump (assist pump) 78.

Further, in this second embodiment of the present invention, the ink (liquid) supply path is sealed on the recording head 10 side of the port 86*c* which is the flow inlet of ink (liquid) fed by the pump (assist pump) 78 so that the choke condition is established. By having this configuration, for example, even when a pump such as a gear pump is used in which a flow of the ink (liquid) cannot be stopped when the pump is stopped, it may be ensured to perform the choke cleaning.

Figure 23:
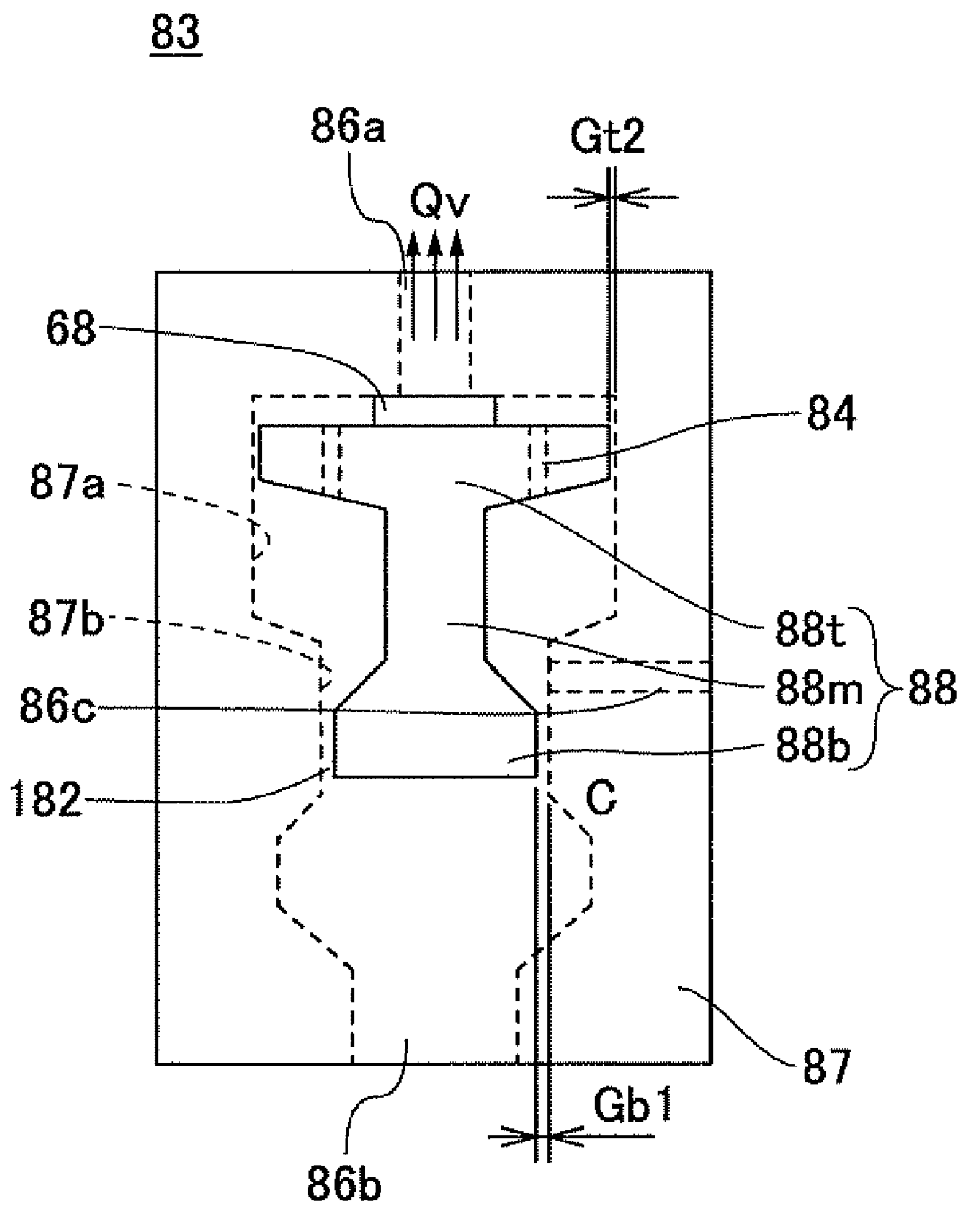
FIG. 23 is a schematic cross-sectional view illustrating another example of the flow path resistance varying unit used in the ink supply system.

Further, as described above, in this embodiment of the present invention, a case is described where the sealing rubber 68 having the conical shape is used as the first elastic member which serves as the sealing member. However, alternatively, any other material having any other shape such as an elastomer having a disk-shape as illustrated in FIG. 23 or an O-ring may be adequately used.

Figure 24:
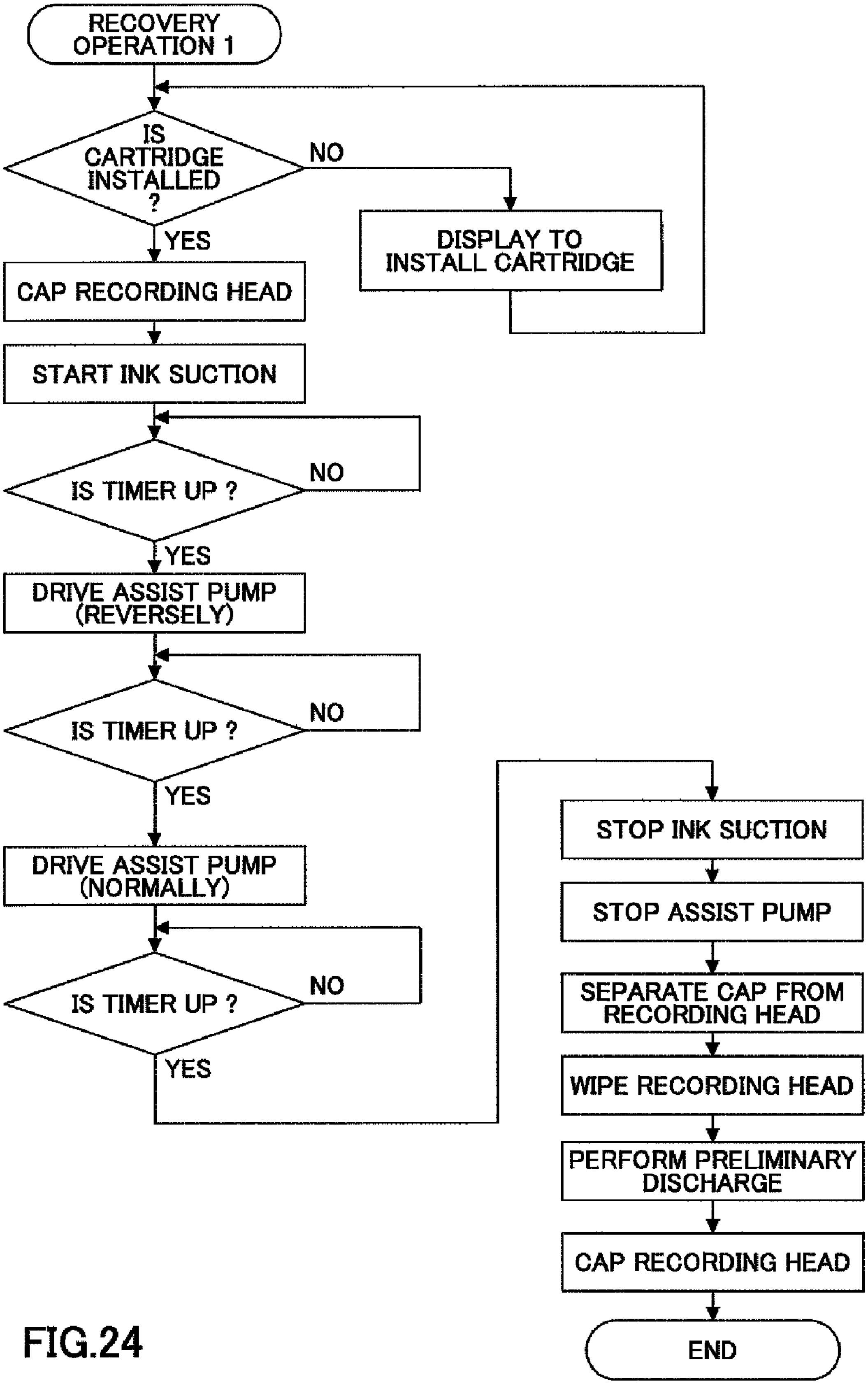
FIG. 24 is a flowchart illustrating the recovery operation according to a third embodiment of the present invention.
Figure 25:
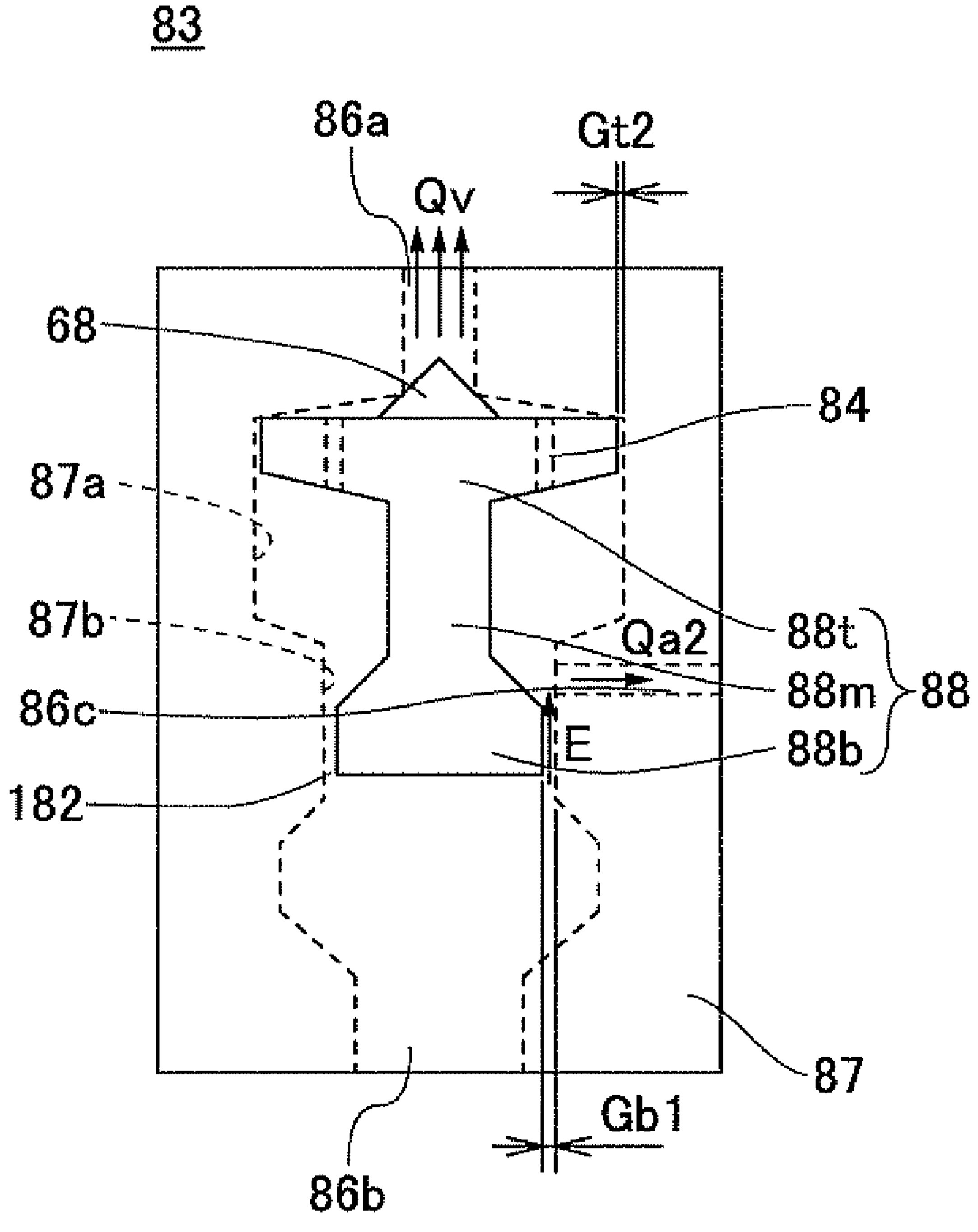
FIG. 25 is a schematic cross-sectional view illustrating an example of the flow path resistance varying unit used in the ink supply system according to the third embodiment of the present invention.

Next, the recovery operation according to a third embodiment of the present invention is described with reference to FIGS. 24 and 25. FIG. 24 is a flowchart illustrating the recovery operation. FIG. 25 schematically illustrates the flow path resistance varying unit 83 according to the third embodiment of the present invention.

In this third embodiment, a reversible pump is used as the pump (assist pump) 78. Further, in the recovery operation, unlike the sequence (procedure) of the recovery operation in the above first embodiment, after a predetermined has passed since the ink suction (nozzle suction) starts, the pump (assist pump) 78 is reversely driven (rotated, operated) to feed ink (liquid) in the direction opposite to the normal direction. When ink (liquid) flows in the opposite direction by the reversely driven pump (assist pump) 78, ink (liquid) having flow rate "Qa2" flows by forming a loop: pump (assist pump) 78→third flow path 62→second flow path 60*a* second throttling part 182 of flow path resistance varying unit 83→port 86*c*→pump (assist pump) 78. As a result, ink (liquid) flows through the second throttling part 182 which is the narrower gap "Gb1" in the arrow "E" direction.

Therefore, the flowing of ink (liquid) through the narrower gap "Gb1" in the arrow "E" direction generates a positive pressure, which pushes the valve body 88 in the flowing direction of ink (liquid) having flow rate "Qa2". As a result, the valve body 88 is further pushed towards the port 86*a* side, which may reinforce the choke condition.

After that, similar to the above first embodiment, after a predetermined time period has passed, the pump (assist pump) 78 is normally driven (rotated, operated) so as to feed ink (liquid) in the normal direction to supply ink (liquid) to the flow path resistance varying unit 83 via the port 83*c* and release the choke condition.

Figure 26:
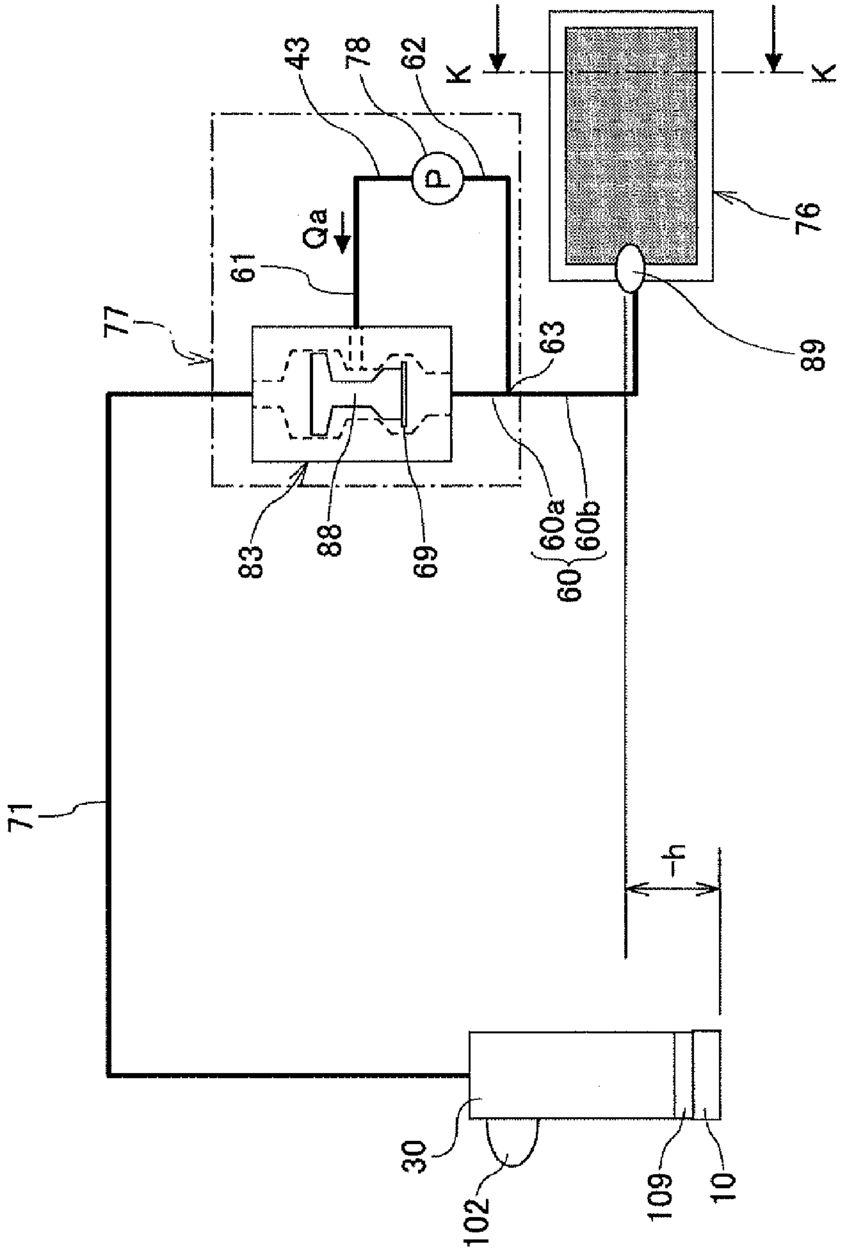
FIG. 26 is a schematic view illustrating a configuration of the ink supply system according to a fourth embodiment of the present invention.
Figure 27A:
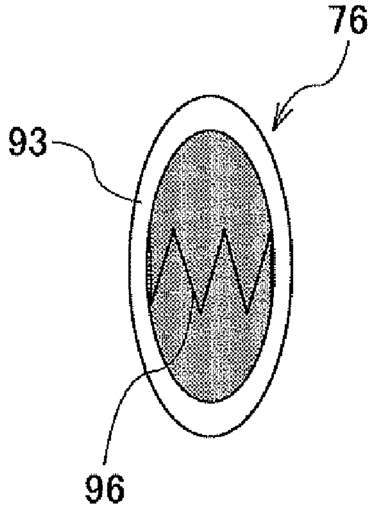
FIGS. 27A and 27B are cross-sectional views cut along a line K-K in FIG. 26.
Figure 27B:
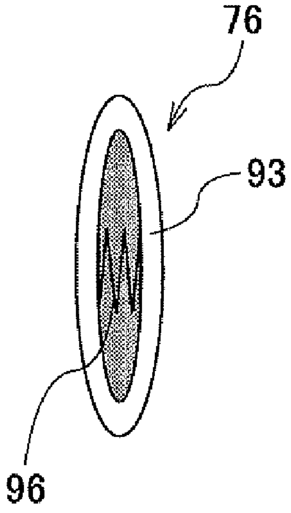
Figure 28B:
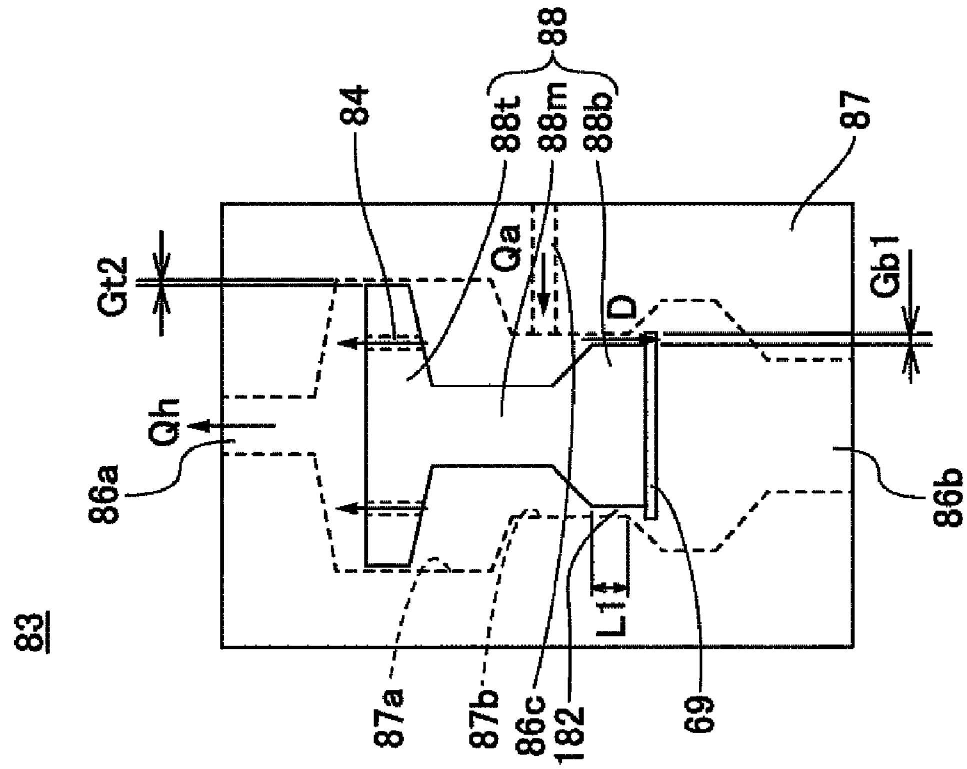
FIGS. 28A and 28B are schematic cross-sectional views illustrating an example of the flow path resistance varying unit used in the ink supply system according to the fourth embodiment of the present invention.
Figure 28A:
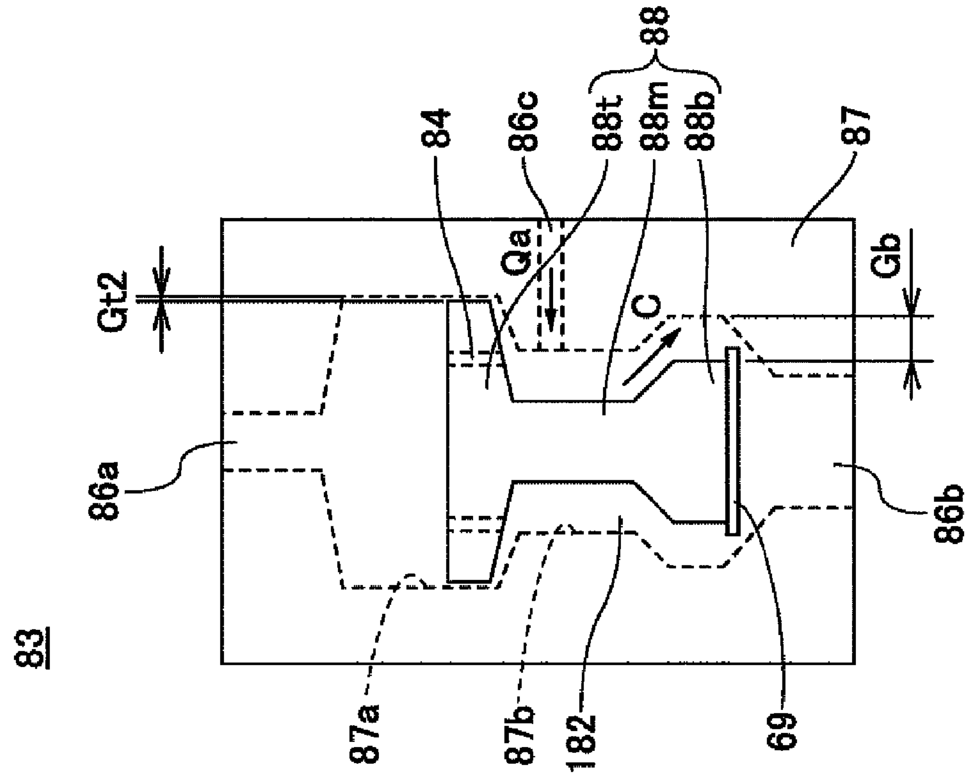
Figure 29A:
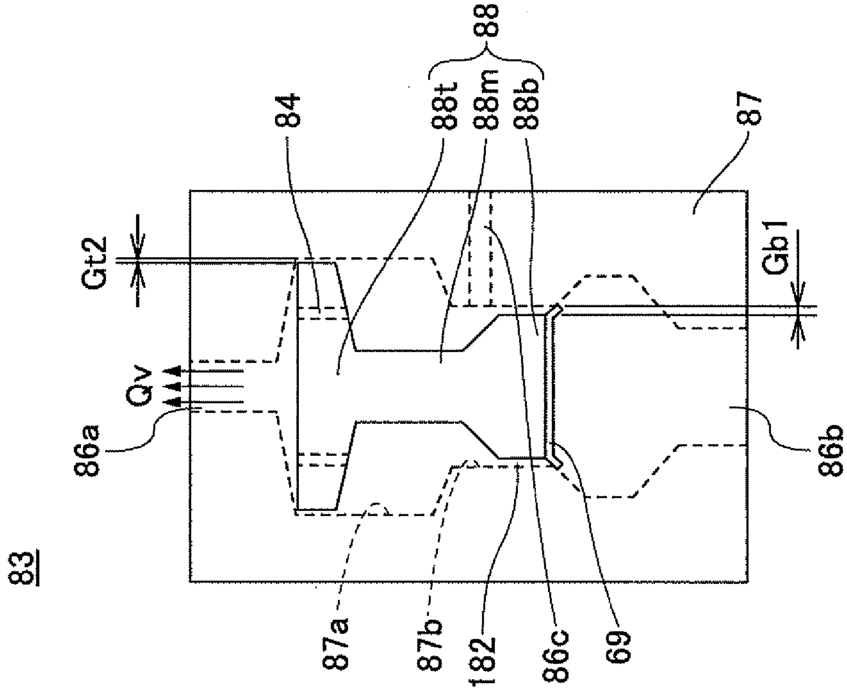
FIGS. 29A and 29B are schematic cross-sectional views illustrating an operation of the flow path resistance varying unit used in the ink supply system according to the fourth embodiment of the present invention.
Figure 29B:
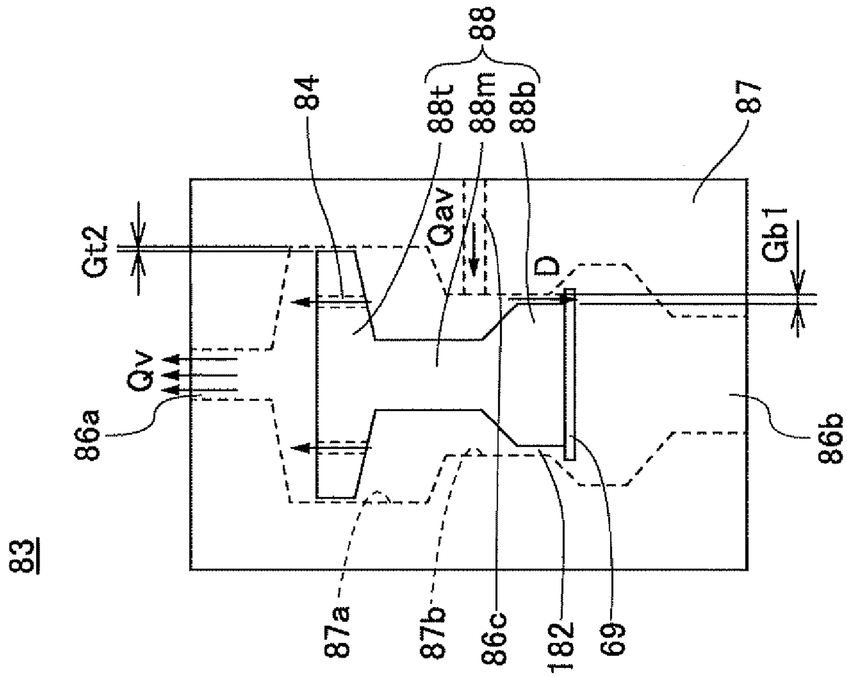

Next, an ink supply system according to a fourth embodiment of the present invention is described with reference to FIGS. 26 through 29. FIG. 26 schematically illustrates a configuration of the ink supply system according to the fourth embodiment of the present invention. FIGS. 27A and 27B are cross-sectional views cut along a line K-K in FIG. 26. FIGS. 28A and 28B are schematic cross-sectional views illustrating an example of a flow path resistance varying unit used in the ink supply system. FIGS. 29A and 29B illustrate an operation of the flow path resistance varying unit in the recovery operation.

First, the ink cartridge (main tank) 76 includes the bag member 93 made of a flexible material that can be flexibly deformed as ink therein is consumed (e.g., the shape is changed from the state of FIG. 27A to the state of FIG. 27B). In the bag member 93 of the ink cartridge (main tank) 76, liquid (ink) is contained. Further, a compression spring 96 is disposed in the bag member 93 as illustrated in FIGS. 27A and 27B.

By having this configuration, the ink cartridge (main tank) 76 may spontaneously generate negative pressure. Therefore, for example, as illustrated in FIG. 26, the ink cartridge (main tank) 76 may be disposed at a position higher than the nozzle surface of the recording head 10.

Next, as illustrated in FIGS. 28A and 28B, similar to the above second embodiment, in the valve body top part 88*t* of the valve body 88 in the flow path resistance varying unit 83, the through holes 84 having small diameters are formed serving as the first throttling part, so that the valve body 88 moves in the tube member 87 in accordance with the flow rate "Qh" of ink (liquid).

On the other hand, on the valve body bottom part 88*b* of the valve body 88, there is provided a circular-shaped sealing rubber 69 serving as the second elastic member which is a sealing member. In a normal printing state, the sealing rubber 69 is disposed (inserted) in a wider diameter section (i.e., disposed lower than the internal flow path 87*b* of the tube member 87, see in a state of FIG. 28A) so that the recording head 10 communicates with the ink cartridge (main tank) 76.

On the other hand, in the recovery operation when the nozzle surface of the recording head 10 is covered with the cap member 52 and the ink suction is performed, the valve body 88 is moved upward as illustrated in FIG. 29A. Then, the sealing rubber 69 seals the second throttling part 182 of the gap "Gb1" formed in the narrow diameter section in the tube member 87. As a result, ink can no longer be supplied from the ink cartridge (main tank) 76 to the recording head, and the negative pressure in the recording head 10 is suddenly increased. Namely, in this embodiment, by sealing the second flow path 60, the communication between the liquid (ink) supply tube (first flow path) 71 and the second flow path 60 can be sealed.

Next, as illustrated in FIG. 29B, the pump (assist pump) 78 is driven (operated) so that ink (liquid) is fed into the flow path resistance varying unit 83 via the port 86*c*. When ink (liquid) is just started flowing into the flow path resistance varying unit 83, the sealing rubber 69 is still sealing the port 86*b* side and also a large negative pressure is still accumulated on the recording head 10 side due to the ink suction (choke condition). Therefore, ink fed by the pump (assist pump) 78 is pushed out to the recording head 10 so that bubbles and foreign matter included between the liquid (ink) supply tube (first flow path) 71 and the recording head 10 may be effectively exhausted to the outside of the ink supply system.

After a while since ink is started to be pushed out to the recording head 10 by the pump (assist pump) 78, due to the ink supply to the recording head 10, the negative pressure on the recording head side 10 is accordingly decreased. As a result, as illustrated in FIG. 29B, the valve body 88 is moved downward and the choke condition established by the sealing rubber 69 is released, so that a part of ink (liquid) fed by the pump (assist pump) 78 starts flowing in the arrow "D" direction. Then, the ink suction is stopped. As a result, the valve body 88 is further moved downward, reaches at the lowest possible point, and stops as illustrated in FIG. 28A. Then, the pump (assist pump) 78 is stopped and the recovery operation is completed.

In this fourth embodiment, the choke condition is established under the condition that the ink inflow port (i.e., port 86*c*) from the pump (assist pump) 78 communicates with the recording head 10. Because of the feature, it may become possible to improve the efficiency of exhausting bubbles and foreign matter in the recording head 10 and the ink (liquid) supply path by increasing the exhaust amount of ink (liquid) when the pump (assist pump) 78 is driven (operated).

Further, in this fourth embodiment, a case is described where the sealing rubber 69 as the second elastic member (sealing member) has a circular shape. However, any other material having any other shape may be adequately selected and used such as an example where high-density foam is formed on the bottom surface or a lower circumference surface of the valve body 88.

Further, in the above descriptions, the operations and effects of the present invention are described based on an example where different color ink are supplied to the respective recording heads. However, the present invention is not limited to this configuration. For example, the present invention may also be applied to cases where the same color ink is supplied to plural recording heads and where differently processed inks (not different color inks) are supplied to the respective recording heads. Further, the present invention may also be applied to a liquid (ink) supply system having a recording head(s) including plural nozzle rows so that different types of fluid are discharged from a single recording head. Further, the present invention is not limited to an image forming apparatus discharging narrowly-defined ink. The present invention may also be applied to a liquid discharging apparatus (described as the "image forming apparatus" in this description of the present invention) discharging various liquids.

According to an embodiment of the present invention, an image forming apparatus includes a recording head having a nozzle for discharging droplets of liquid; a liquid tank that stores liquid to be supplied to the recording head; a first fluid flow path that supplies the liquid to the recording head; a second fluid flow path that is in fluid communication with the liquid tank; a pressure adjusting valve that allows fluid communication between the first fluid flow path and the second fluid flow path and that has an internal flow path resistance that varies depending upon a flow rate of liquid flowing through the first fluid flow path; a third fluid flow path that allows fluid communication between the second fluid flow path and the pressure adjusting valve or between the liquid tank and the pressure adjusting valve; a liquid feeding unit provided in the third fluid flow path; a cap member that covers a nozzle surface of the recording head; and a suction unit that is in fluid communication with the cap member. Further, when droplets of liquid are discharged through the nozzle, the recording head is in fluid communication with the liquid tank via the pressure adjusting valve, and the liquid feeding unit feeds the liquid from the liquid tank to the recording head. The pressure adjusting valve includes a tube member that defines an internal fluid flow path of the pressure adjusting valve; a movable member that is movably disposed in the internal fluid flow path. Further the tube member and the movable member forms a first throttling part disposed on a side of the first fluid flow path and a second throttling part disposed on a side of the second fluid flow path; the third fluid flow path is in fluid communication with a part between the first throttling part and the second throttling part; the movable member moves depending on the flow rate of liquid flowing in the first fluid flow path; a throttle value of the second throttling part varies depending on a movement of the movable member; and the movable member includes a sealing unit that seals the fluid communication between the first fluid flow path and the second fluid flow path when the cap member covers the nozzle surface of the recording head and a negative pressure is generated in a cap-member space formed between the cap member and the nozzle surface by driving the suction unit.

Further, when the movable member seals the fluid communication between the first fluid flow path and the second fluid flow path and the liquid feeding unit is driven to feed the liquid, the sealed fluid communication between the first fluid flow path and the second fluid flow path may be released.

Further, when the fluid communication between the first fluid flow path and the second fluid flow path is sealed, the throttle value of the second throttling part may indicate the maximum value.

Further, the sealing unit that seals the fluid communication between the first fluid flow path and the second fluid flow path may be a first elastic member that is provided on the movable member and that seals the first fluid flow path.

Further, the sealing unit that seals the fluid communication between the first fluid flow path and the second fluid flow path may be a second elastic member that is provided on the movable member and that seals the fluid communication between the second throttling part and the second fluid flow path.

Further, the liquid feeding unit may be a reversible liquid feeding unit that further generates a liquid flow in a direction from the second throttling part to the first throttling part when the movable member seals the fluid communication between the first fluid flow path and the second fluid flow path.

Further, the sealing unit that seals the fluid communication between the first fluid flow path and the second fluid flow path may be a sealing member that is provided on the movable member and that seals the first fluid flow path, and when the sealing member seals the first fluid flow path, a space may be formed surrounding the sealing member.

In this case, when viewed in a direction parallel to a moving direction of the movable member, a projected area of the sealing member may be smaller than a projected area that is obtained by subtracting the projected area of the sealing member from a projected area of the movable member.

In an image forming apparatus according to an embodiment of the present invention, when ink (liquid) droplets are discharged from the nozzle of the recording head, the liquid feeding unit (assist pump) feeds ink (liquid) from the liquid tank to the recording head while the recording head is in fluid communication with the liquid tank via the pressure adjusting valve. By having the configuration, it may become possible to apply an appropriate pressure to the recording head in response to the ink (liquid) discharge amount discharged from the recording head by automatically adjusting the assist pressure so as to prevent the occurrence of the refill shortage due to use of a longer tube member, the increase of the ink (liquid) discharge amount, use of ink having a higher viscosity or the like. Further, the fluid communication between the first fluid flow path and the second fluid flow path is sealed when the nozzle surface of the recording head is covered with the cap member and the suction unit is driven to generate the negative pressure in the cap-member space between the cap member and the nozzle surface of the recording head. By having the configuration, it may become possible to effectively exhaust bubbles and foreign matters in the ink (liquid) supply path and the liquid discharge head (recording head) by performing the choke cleaning.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a recording head having a nozzle for discharging droplets of liquid;

a liquid tank that stores liquid to be supplied to the recording head;

a first fluid flow path that supplies the liquid to the recording head;

a second fluid flow path that is in fluid communication with the liquid tank;

a pressure adjusting valve that allows fluid communication between the first fluid flow path and the second fluid flow path and that has an internal flow path resistance that varies depending upon a flow rate of liquid flowing through the first fluid flow path;

a third fluid flow path that allows fluid communication between the second fluid flow path and the pressure adjusting valve or between the liquid tank and the pressure adjusting valve;

a liquid feeding unit provided in the third fluid flow path;

a cap member that is configured to cover a nozzle surface of the recording head; and a suction unit that is in fluid communication with the cap member, wherein when droplets of liquid are discharged through the nozzle, the recording head is in fluid communication with the liquid tank via the pressure adjusting valve, and the liquid feeding unit feeds the liquid from the liquid tank to the recording head, the pressure adjusting valve includes a tube member that defines an internal fluid flow path of the pressure adjusting valve;

a movable member that is movably disposed in the internal fluid flow path, wherein the tube member and the movable member form a first throttling part disposed on a side of the first fluid flow path and a second throttling part disposed on a side of the second fluid flow path, the third fluid flow path is in fluid communication with a part between the first throttling part and the second throttling part, the movable member moves depending on the flow rate of liquid flowing in the first fluid flow path, a throttle value of the second throttling part varies depending on a movement of the movable member, and the movable member includes a sealing unit that seals the fluid communication between the first fluid flow path and the second fluid flow path when the cap member covers the nozzle surface of the recording head and a negative pressure is generated in a cap-member space formed between the cap member and the nozzle surface by driving the suction unit.

2. The image forming apparatus according to claim 1, wherein when the movable member seals the fluid communication between the first fluid flow path and the second fluid flow path and the liquid feeding unit is driven to feed the liquid, the sealed fluid communication between the first fluid flow path and the second fluid flow path is released.

3. The image forming apparatus according to claim 1, wherein when the fluid communication between the first fluid flow path and the second fluid flow path is sealed, the throttle value of the second throttling part indicates a maximum value.

4. The image forming apparatus according to claim 1, wherein the sealing unit that seals the fluid communication between the first fluid flow path and the second fluid flow path is a first elastic member that is provided on the movable member and that seals the first fluid flow path.

5. The image forming apparatus according to claim 1, wherein the sealing unit that seals the fluid communication between the first fluid flow path and the second fluid flow path is a second elastic member that is provided on the movable member and that seals the fluid communication between the second throttling part and the second fluid flow path.

6. The image forming apparatus according to claim 1, wherein the liquid feeding unit is a reversible liquid feeding unit that further generates a liquid flow in a direction from the second throttling part to the first throttling part when the movable member seals the fluid communication between the first fluid flow path and the second fluid flow path.

7. The image forming apparatus according to claim 1, wherein the sealing unit that seals the fluid communication between the first fluid flow path and the second fluid flow path is a sealing member that is provided on the movable member and that seals the first fluid flow path, and when the sealing member seals the first fluid flow path, a space is formed surrounding the sealing member.

8. The image forming apparatus according to claim 7, wherein when viewed in a direction parallel to a moving direction of the movable member, a first projected area of the sealing member inside the first fluid flow path when the sealing member seals the first fluid flow path is smaller than a projected area specified by subtracting the first projected area from a second projected area which corresponds to a surface of the movable member, the surface facing the first flow path.

* * * * *